(12) United States Patent
Reedman et al.

(10) Patent No.: US 8,366,285 B2
(45) Date of Patent: Feb. 5, 2013

(54) FOLDABLE REAR VIEW MIRROR ASSEMBLY FOR A VEHICLE

(75) Inventors: Matthew John Reedman, Blackwood (AU); Maarten Johannes Schuurmans, Kingswood (AU); Daniel Joseph Flynn, Morphett Vale (AU)

(73) Assignee: SMR Patents S.a.r.l., Luxembourg (LU)

( * ) Notice: Subject to any disclaimer, the term of this patent is extended or adjusted under 35 U.S.C. 154(b) by 307 days.

(21) Appl. No.: 12/536,042

(22) Filed: Aug. 5, 2009
(Under 37 CFR 1.47)

(65) Prior Publication Data
US 2010/0238570 A1 Sep. 23, 2010

(30) Foreign Application Priority Data
Mar. 18, 2009 (AU) .................................. 2009201083

(51) Int. Cl.
*G02B 5/08* (2006.01)
*G02B 7/18* (2006.01)
*A47G 1/24* (2006.01)
*B60R 1/02* (2006.01)

(52) U.S. Cl. ....................... 359/841; 248/477; 248/479

(58) Field of Classification Search .................. 359/841, 359/872, 877; 248/477–479
See application file for complete search history.

(56) References Cited

U.S. PATENT DOCUMENTS

| 6,022,113 | A | 2/2000 | Stolpe et al. |
| 6,322,221 | B1 | 11/2001 | van de Loo |
| 7,374,299 | B2 | 5/2008 | Brouwer et al. |
| 7,547,855 | B2 | 6/2009 | Brouwer et al. |
| 2003/0218812 | A1* | 11/2003 | Foote et al. ............... 359/874 |
| 2006/0285254 | A1* | 12/2006 | Ruse et al. ............... 360/244.5 |

* cited by examiner

*Primary Examiner* — Alessandro Amari
*Assistant Examiner* — Kimberly N Kakalec
(74) *Attorney, Agent, or Firm* — Reising Ethington P.C.

(57) ABSTRACT

A foldable rearview mirror assembly for a vehicle is disclosed. The assembly comprises: a mounting bracket mountable to a vehicle, the mounting bracket having a base with detent features disposed on a detent circle on the base; a mirror head frame rotatably mounted to the mirror base for rotation about a mirror head axis, the frame having detent features to match the detent features of the base, the detent features of the base and the frame forming a detent system, the detent system having at least a drive position. The frame is shaped to provide an aperture to receive either of: a manual fold insert; or a power fold mechanism having a clutch mechanism, the aperture at least partially inboard in a radial direction with respect to the detent features on the frame whereby at least the clutch mechanism of the power fold mechanism can be accommodated to operate on a smaller radius than that of the detent features.

8 Claims, 35 Drawing Sheets

FOLDABLE REAR VIEW MIRROR ASSEMBLY FOR A VEHICLE

FIELD OF INVENTION

The invention is based on a priority patent application AU2009201083 which is hereby incorporated by reference.

The present invention relates to fold mechanisms for external rear vision systems of motor vehicles, and in particular to fold mechanisms that incorporate or at least provide for, power folding.

BACKGROUND OF THE INVENTION

Motor vehicles typically have two external rear vision mirror assemblies. The mirror assemblies typically have a mirror head that is designed to rotate about a substantially vertical pivot axis in both forward and rearward directions. The mirror head is typically held in its driving position by a detent which allows manual movement of the mirror head to a parked position and manual movement to a forward position. There are a number of reasons for this. One reason is safety. By having a mirror that can "break away" to move from a deployed position to a parked or forward position, injury to people can be avoided or at least minimised which is a mandatory feature for a approvals. Furthermore, damage to the mirror head can be avoided or at least minimised by allowing it to move when it hits obstructions. It is also useful to have a mirror head that can be parked, that is rotated to a position substantially parallel to the side of the vehicle, so as to narrow the effective width of the vehicle. This is particularly useful when the vehicle is parked in or is travelling along narrow or congested roadways. It is also useful for loading vehicles onto trucks for transport to be able to park the mirror heads.

Modern external rear vision mirrors, in addition to having a detent mechanism to hold the mirror head in a deployed position while at the same time enabling forward folding and rearward folding of the mirror head, also have electric drive systems to allow the operator to drive the head at least to its parked position. Some external rear view mirror assemblies have more sophisticated electric systems that allow the operator to redeploy the mirror head to a drive position after it has been manually pushed forward or rearward. These mirror systems are typically referred to as power fold mirrors.

Power fold mirrors typically employ power fold mechanisms that hold the mirror head against rotation in one direction with respect to the mirror base. This is usually achieved using a non-back-drivable gear train (such as a gear train employing a worm gear). As a result, the gear train is subject to significant forces and or torques resulting from wind, road and static forces. Thus, the power fold mechanism must be strong, rigid and have a good fastening system to both the mirror base and to the mirror frame. These requirements increase complexity and cost. They also mean that the mirror assembly must be specifically designed as a power fold mirror assembly with many different components to a non-power fold system.

A problem with some power fold mechanisms is that when the mirror head is manually rotated away from its drive or deployed position, torque is transmitted through the path of drive train before a clutch disengages. This is a problem for a number of reasons, one of which is as follows. The clutch for the drive train is sometimes radially inboard of the manual fold detent system. This means that even during normal operation, vibration loads can be transmitted through the drive train system and hence through the radially inboard detents. Because the radially inboard detents are not as far radially outboard as the manual fold detents, this results in less stability and increased vibration of the mirror head compared to that achieved with non-power folding mirrors that only have a manual fold detent system operating on a larger radius.

An external rear view mirror for automobiles is disclosed in U.S. Pat. No. 6,022,113 The rear view mirror disclosed by that US patent has a non-back-drivable worm gear that locks a gear wheel in place. The gear wheel can be driven by the worm gear but cannot drive back through the worm gear. Thus, the gear wheel can be used (and is used) as a stop, holding the drive housing 4 and hence the mirror head against fold path limiter stop cams on the mirror base 2. As a result, the gear train is subject to significant forces resulting from wind, road and static forces while it is held in the drive position. These forces are transmitted from the mirror head 3 to the powerfold housing 4 via a case frame in the mirror head. The force is then further transferred through the worm and gear teeth to the detent system on the bottom of the gear. Here it meets the reaction force provided by the spring that clamps the system. If the force supplied is great enough, the detent system will disengage compressing the spring and allowing the mirror head to manually rotate it to the parked position.

As should be apparent from the above, with the mirror described in U.S. Pat. No. 6,022,113, the powerfold housing 4, the drive train including gear wheel 6 and worm gear 11 are subject to significant forces and must be strong and rigid. Furthermore, the mirror of U.S. Pat. No. 6,022,113 cannot really be modified to become a non-powerfold mirror assembly.

Existing power fold rear view mirrors are designed separately from the design of simple pivotal mirrors. Therefore the supply of a vehicle platform with rear vie mirrors requests different designs for the two different types of mirror which increases the over all costs. The idea of the invention is to overcome the problem of two different designs and to use a common design for mirro bracket and mirror housing with or without powerfold actuation.

It is an object of the present invention to provide an improved power fold mechanism that overcomes at least some of the problems outlined above or at least offers a useful choice to reduce costs for different designs of mirror components.

SUMMARY OF THE INVENTION

The invention is an external rear view mirror assembly to be fitted to a motor vehicle, the assembly comprising:
  a mounting bracket mountable to a vehicle, the mounting bracket having a base;
  a mirror head frame rotatably mounted to the base for rotation about a mirror head axis;
  a detent operably interposed between the base and the frame, the detent having at least a drive position;
  a primary spring acting between the frame and the base in a direction parallel to the mirror head axis, the primary spring for holding the detent engaged in the detent position(s); and
  a power fold mechanism operably interposed between the mirror base and the frame, the power fold mechanism having a drive train, and a clutch mechanism, the clutch mechanism comprising a pair of opposed clutching faces connecting the drive train to the base when the drive train is driving, the clutch mechanism arranged and constructed such that forces are not transmitted from the mirror head frame to the drive train during manual folding of the mirror head when the drive train is not driving.

BRIEF DESCRIPTION OF THE DRAWINGS

Preferred embodiments of the invention are illustrated in the accompanying representations in which:

FIGS. 14a-14e are similar diagrammatic views to that of FIG. 9a but show progressive movement during manual folding of the mirror head out after the mirror head has been electrically folded in.

DETAILED DESCRIPTION OF PREFERRED EMBODIMENTS OF THE INVENTION

Figure 1:
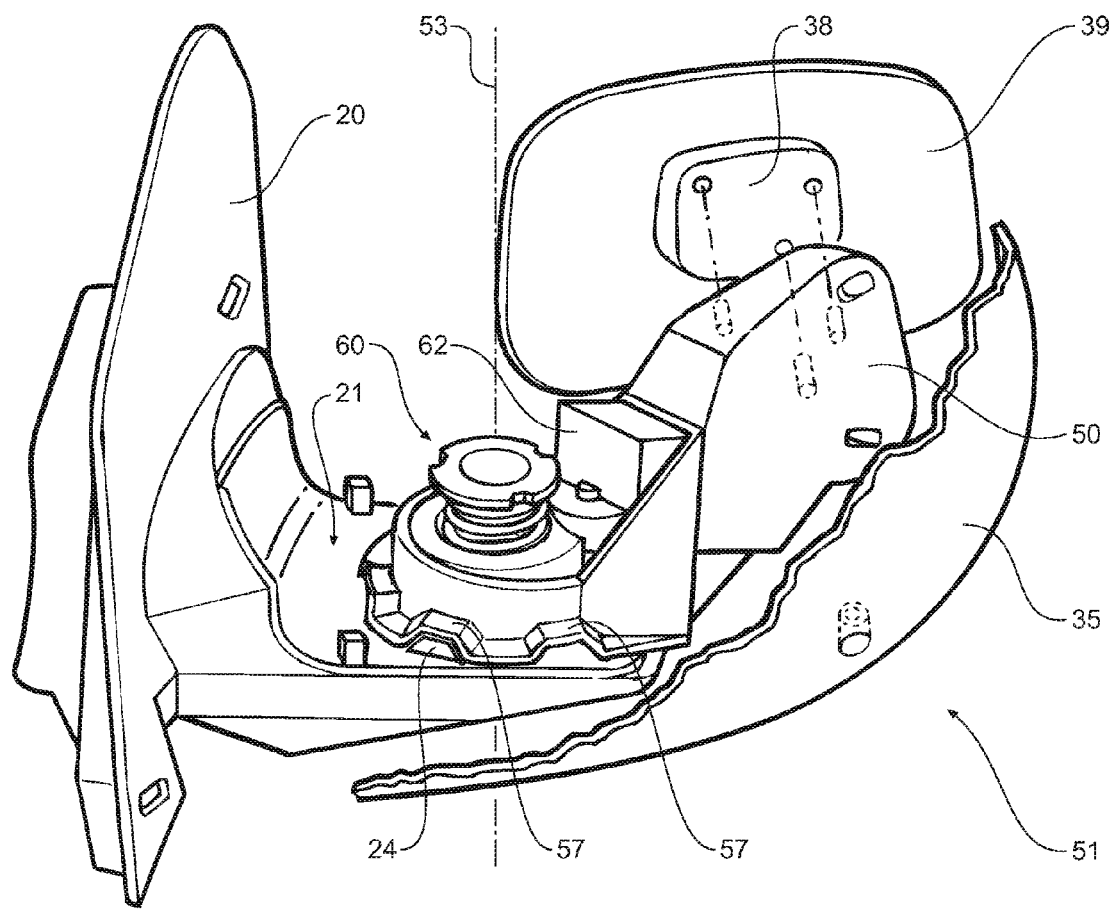
FIG. 1 shows a diagrammatic cut-way perspective view of an external rear view mirror assembly according to the invention.

Referring to FIG. 1, a foldable rear view mirror assembly for a vehicle is shown. The mirror assembly has a mounting bracket 20 mountable to a vehicle (not shown). The mounting bracket 20 has a base 21 with detent features 24 disposed on a detent circle on the base 21. A mirror head 51 having a mirror head frame 50 is rotatably mounted to the base 21 for rotation about a mirror head axis 53. The frame 50 has detent features 57 to match the detent features 24 of the base. The detent features 24 and 57 at the base 21 and the frame 50 form a detent system. The detent system has at least a drive position, the position shown in FIG. 1. The drive position is the position that is usually adopted when the vehicle is in operation so that the vehicle driver can use the actual mirror within the mirror mount 39 to obtain rear vision.

Figure 2:
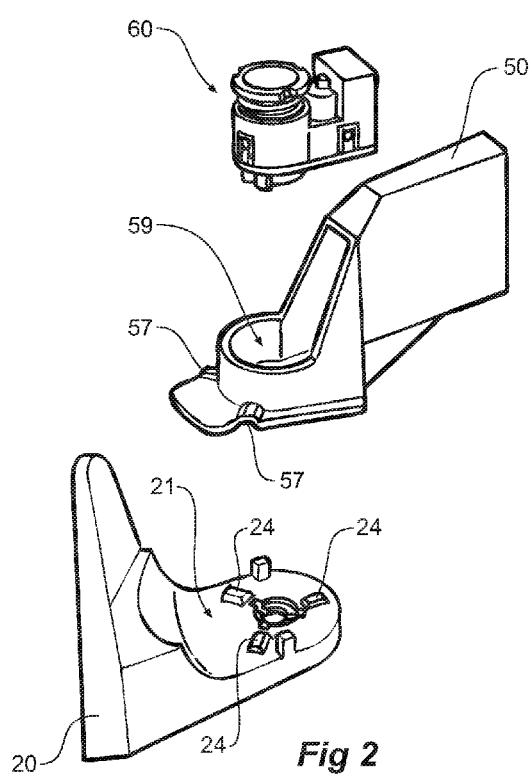
FIG. 2 is an exploded view showing elements of the assembly of FIG. 1 including the power fold mechanism.
Figure 3:
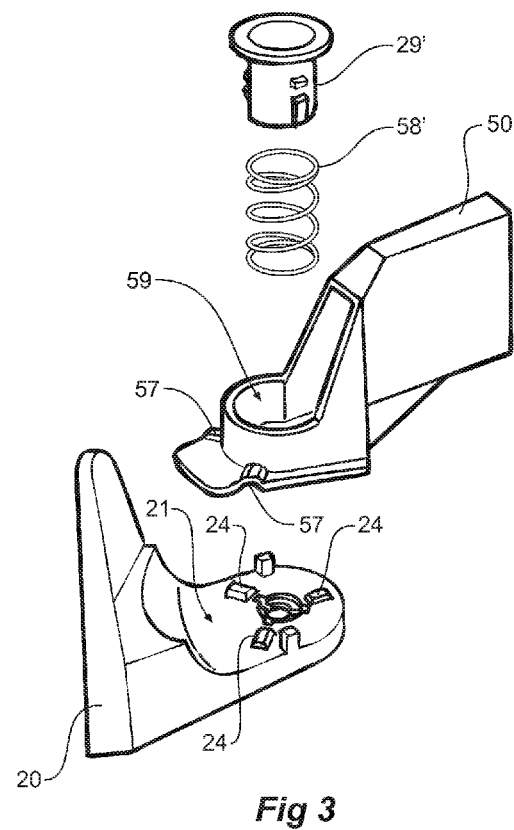
FIG. 3 is an exploded view showing elements of the assembly of FIG. 1 showing a manual fold mechanism.
Figure 4:
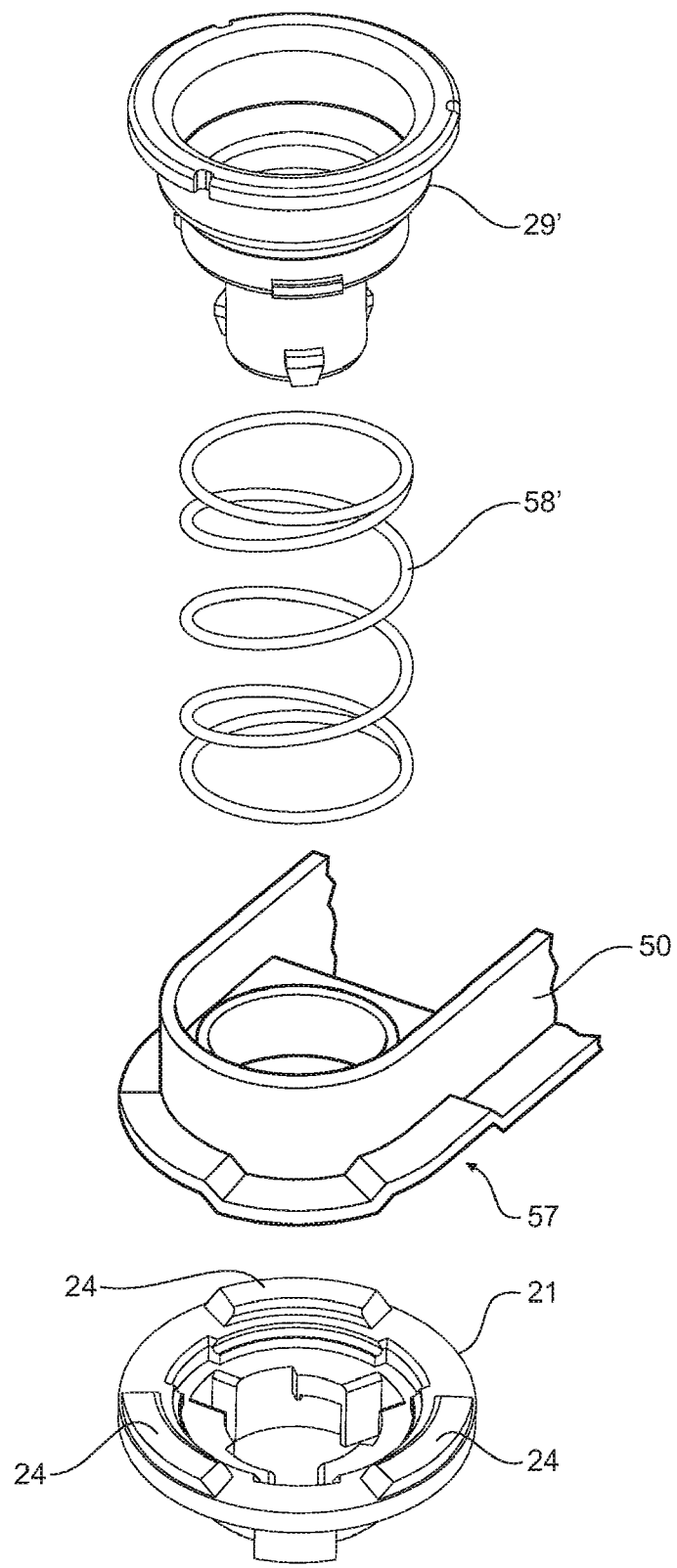
FIG. 4 is an exploded perspective view showing part of the assembly of FIG. 3 in more detail

Now turning to FIGS. 2 and 3, it can be seen that the frame 50 is shaped to provide an aperture 59 for receiving either of the power fold mechanism 60 shown in FIG. 2 or a manual fold insert (comprised of a spring 58' and a spigot 29') as shown in FIG. 3. This means that the design of mirror head frame 50 and mirror base is identical for both features with or without power fold.

The aperture 59 is at least partially inboard in a radial direction with respect to the detent 57 on the frame 50 whereby at least a clutch mechanism of the power fold mechanism 60 can be accommodated to operate on a smaller radius (measured from the mirror head axis 53 shown in FIG. 1) than that of the detent features 57. This is important for the manual fold steps are made on detent levels and the larger radius of the position of detents help to fix the mirror head rigidly. The reduction of the power fold 60 and the implemented clutch mechanism in the inner radius of the aperture is on the one side a way to implement a common design for power fold and none power fold use and the reduce mechanical forces to the clutch.

The power fold mechanism 60 has a spigot 29, a housing 40, a spring 58, a drive train 70 (best shown in FIG. 6) and a clutch mechanism. The spigot 29 holds the spring 58 compressed between the base 21 and the housing 40 and hence the frame 50, thereby holding the detent formed by detent features 24 and 57 engaged against at least wind loads. The clutch mechanism comprises a pair of opposed clutching faces (which will be described later) biased together by the spring 58. The clutching faces connect the drive train 70 to the base 21 when the drive train is driving.

With the foldable rear view mirror assembly described above and shown in FIGS. 1-3, a manual fold insert as illustrated in FIG. 3 can be provided instead of the power fold mechanism 60. The manual fold insert simply comprises a spigot 29' and a spring 58'. The spigot 29' holds the spring 58' compressed between the base 21 and the frame 50 thereby holding the detent formed by detent feature 57 on the frame 50 and detent features 24 on the base 21 engaged against at least wind loads.

Figure 9A:
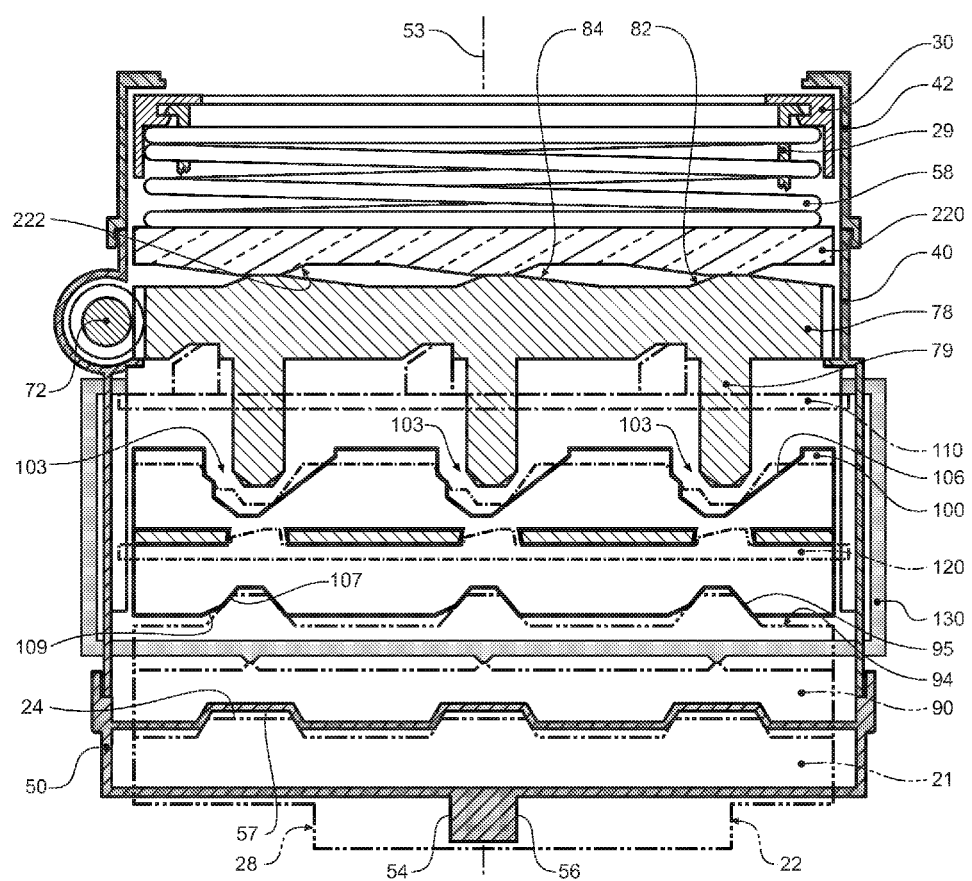
FIG. 9a is a diagrammatic view of the assembly of FIGS. 1 and 2.

The power fold mechanism will now be described with reference to diagrammatic FIG. 9a. FIG. 9a shows diagrammatically a base 21 (that typically forms part of a mirror bracket directly mountable to a vehicle), and a mirror head frame 50 rotatably mounted to the base 21 for rotation about a mirror head axis 53.

A detent that is operably interposed between the base 21 and the frame 50 is formed by detent features 24 and 57 located on the mirror base 21 and frame 50 respectively. The detent has a drive position, the position shown in diagrammatic FIG. 9a and FIG. 1.

A primary spring 58 acts between the frame 50 and the base 21 by virtue of its compression between a retainer 30 connected to a spigot 29 which fits by a bayonet fitting at its lower end into the base 21. The primary spring 58 acts in a direction parallel to the mirror head axis 53 and holds the detent engaged in the detent position.

Referring now to the exploded view of FIG. 6 as well as diagrammatic FIG. 9a, the powerfold mechanism will now be described in more detail. The power fold mechanism is operably interposed between the mirror base 21 and frame 50 and comprises a housing 40 installable into the mirror head frame 50 for rotation therewith. The power fold mechanism also comprises a drive train 70 that includes a motor 75 mounted to the housing. The drive train includes a worm gear 72 that engages a drive gear 78 that has a plurality of circumferentially spaced apart axially extending protrusions 79.

The power fold mechanism also includes a main ramp ring 100 interposed between the drive gear 78 and the base 21. The main ramp ring 100 has a plurality of ramp recesses 103 for receiving respective protrusions 79 of the drive gear 78 such that relative rotation between the drive gear 78 and the main ramp ring 100 results in their relative axial displacement. The main ramp ring 100 is operatively connected to the base so as to provide a clutch. The clutch has an engaged position where the main ramp ring 100 is rotationally fixed with respect to the base 21 and a disengaged position in which the main ramp ring 100 is rotatable with respect to the base 21 about axis 53.

Figure 6:
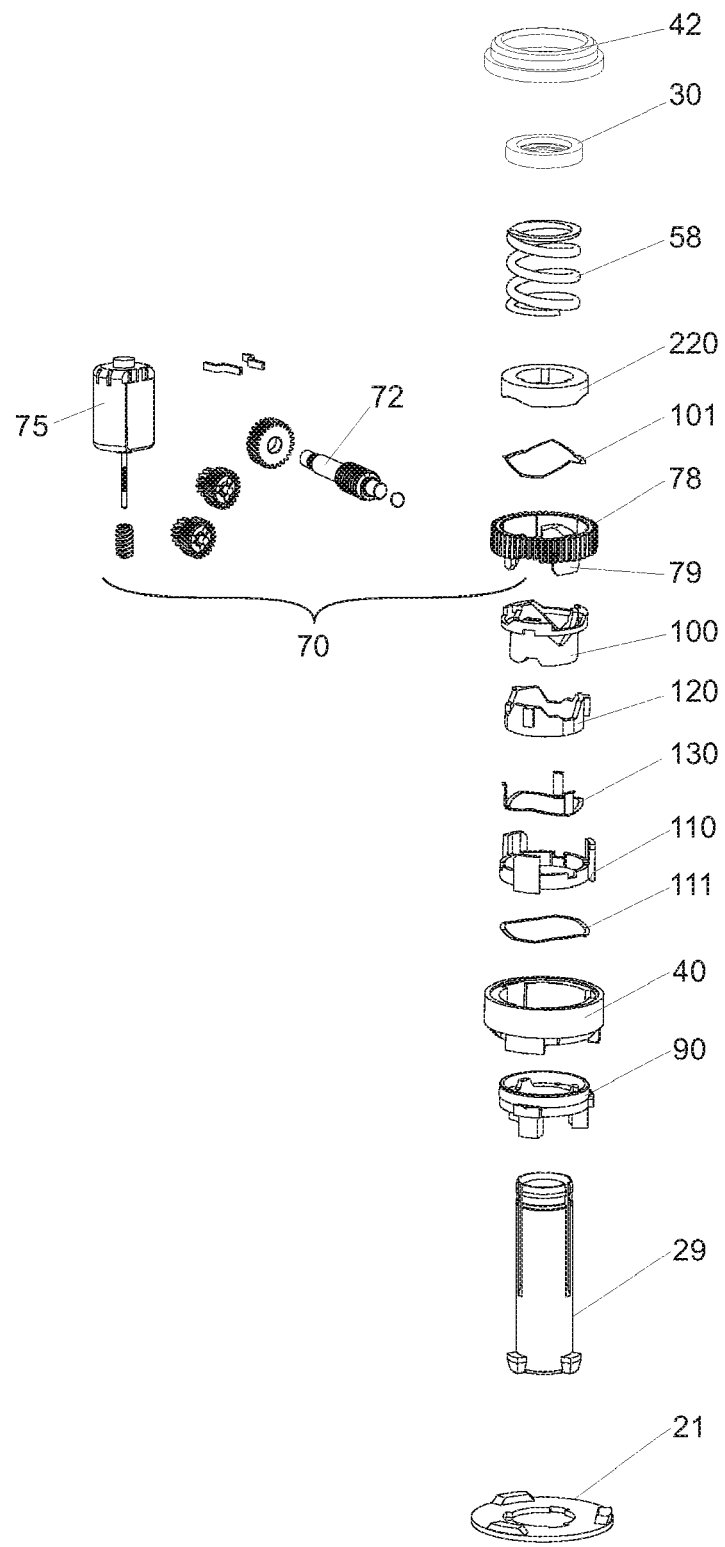
FIG. 6 is an exploded perspective view showing components of the power fold mechanism of FIGS. 1 and 2 in more detail.
Figure 8C:
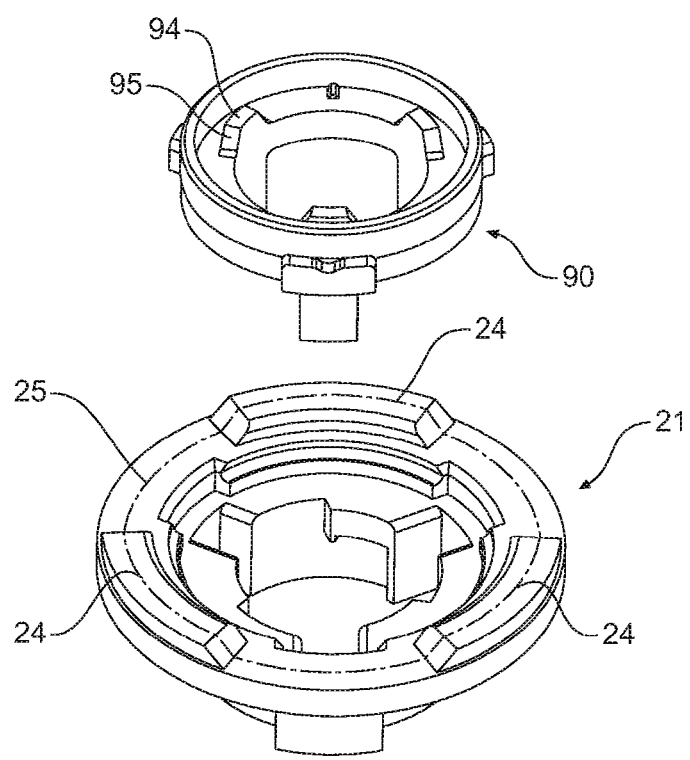
Figure 9B:
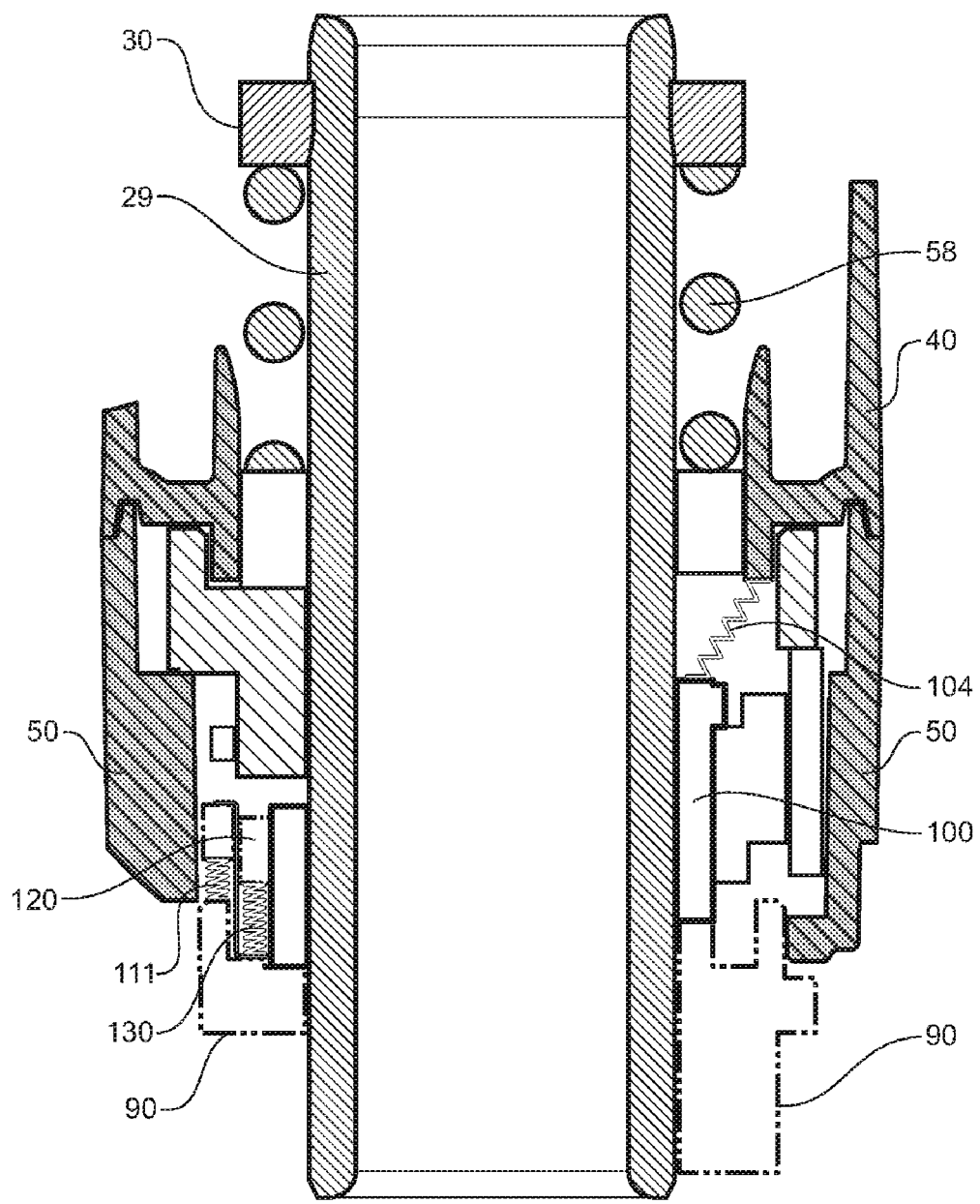
FIG. 9b is a diagrammatic view of the assembly of FIGS. 1 and 2 showing various elements, including a main ramp ring minor spring, an electric stall ring spring and a manual fold spring.

Referring now to FIG. 6, it can be seen that a drive disc 90 connects into the base 21. The drive disc 90 has a clutch face 94 comprising clutch ramps 95 arranged to engage with a corresponding clutching face and clutching ramps 107 and 109 on the underside of the main ramp ring 100 (shown in FIG. 9, FIG. 9a and FIG. 8c).

A manual fold torque transmission member in the form of a manual fold ring is splined to the housing 40 to allow relative axial movement but not relative rotational movement with respect to the housing 40. The manual fold ring has an engaged position in which it engages the main ramp ring 100 such that the main ramp ring 100 rotates with the housing 40. The manual fold ring 120 also has a disengaged position in which the main ramp ring 100 is not constrained to rotate with the housing 40. This arrangement, which will become clearer when the operation of the mirror head is described below, ensures that during manual folding of the mirror head from the drive position (for instance to the park position) forces are not transmitted from the mirror head frame 50 to the drive gear 78.

Figure 8A:
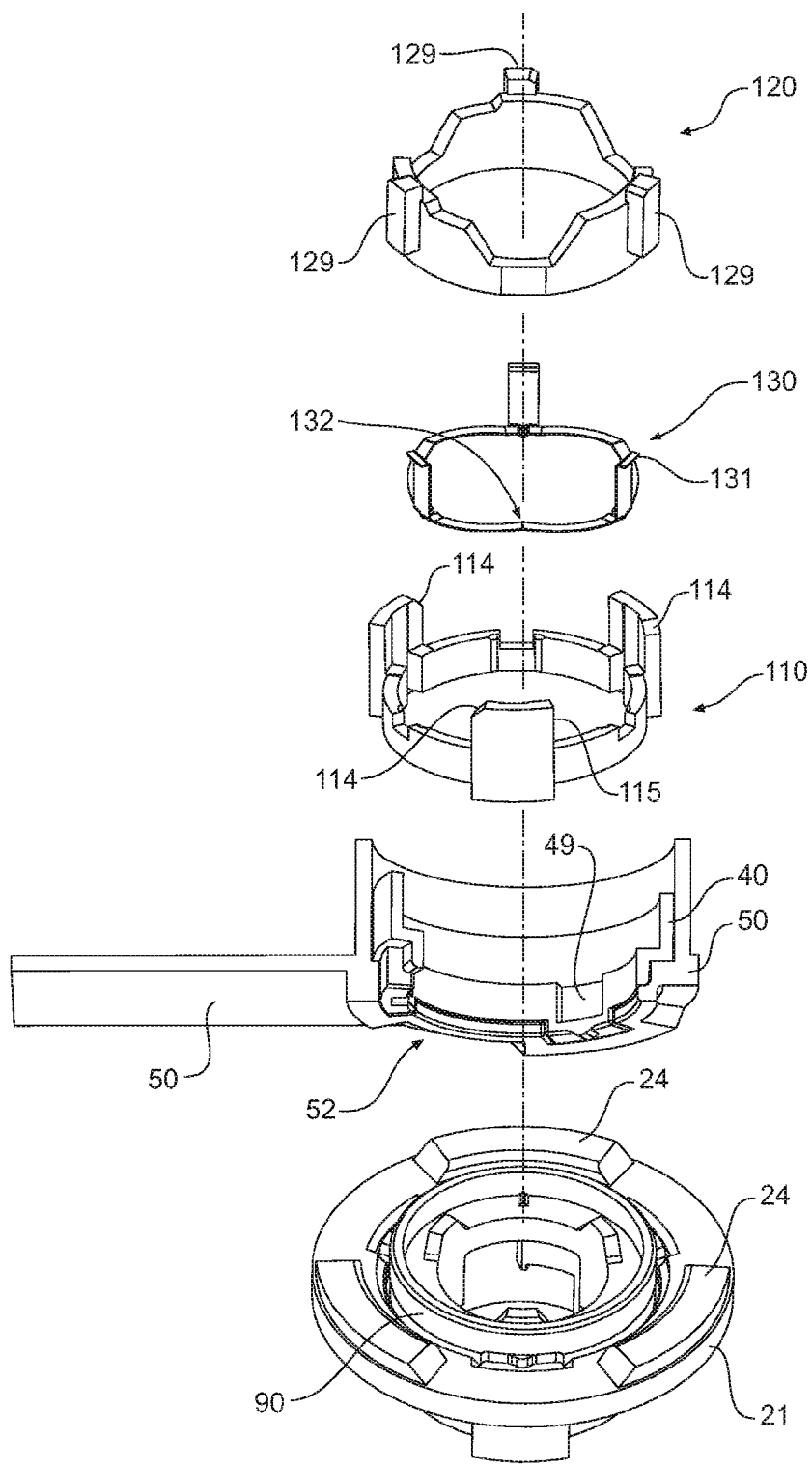
FIG. 8a is a detailed perspective view showing components of FIG. 6 in more detail, including a manual fold ring and an electric stall ring.
Figure 8B:
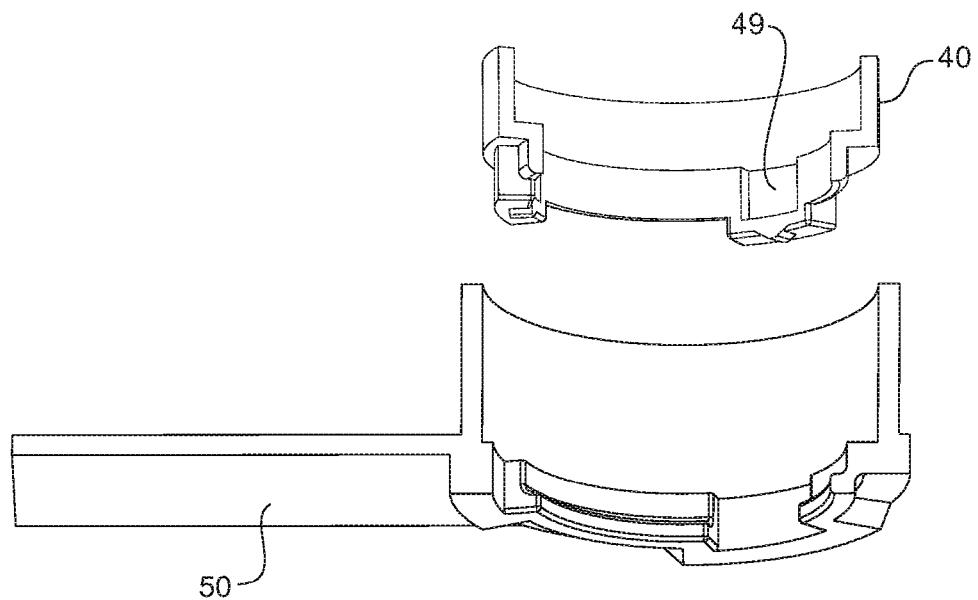
FIGS. 8b and 8c show components of FIG. 8a separated.

An electric stall ring 110 is provided to stop the drive gear 78 at the drive position during electric folding from the park position to the drive position. This reduces delay in the operation of the mechanism. The electric stall ring 110 also positions the drive gear 78 to prevent it engaging the main ramp ring 100 during manual folding and thus prevents load being transferred to the drive gear 78 during the folding. The electric stall ring 110 is splined to the housing 40 by way of a spline key that sits in the spline key way 49 as shown in FIGS. 8a and 8b.

The electric stall ring 110 solves a problem that occurs with some powerfold mechanisms. It prevents the powerfold mechanism driving "through the clutch". That is it stops the powerfold mechanism overcoming the holding torque of the clutch. This is because the electric stall ring produces a force loop with the worm gear 72 pushing on the housing 40, the gears 72 pushing on the drive gear 78, the drive gear 78 pushing on the electric stall ring 110 and the electric stall ring 110 pushing back onto the housing 40 (the electric stall ring 110 is splined to the housing 40). Thus the stall torque that is generated once the stall position is reached is confined to the drive train and the housing and does not transfer to the clutch. This means that the designer can design the system to use a higher drive torque, even a drive torque higher than the clutch torque. In practice, and with the embodiment of the invention shown in the drawings, the drive torque is less than the clutch torque. With the embodiment shown, employing the electric stall ring 110, even if the system wears, the powerfold system will not drive "through the clutch". The system employing electric stall ring 110 also has the advantage that the clutch system is not stressed as frequently as would otherwise be the case.

Figure 7:
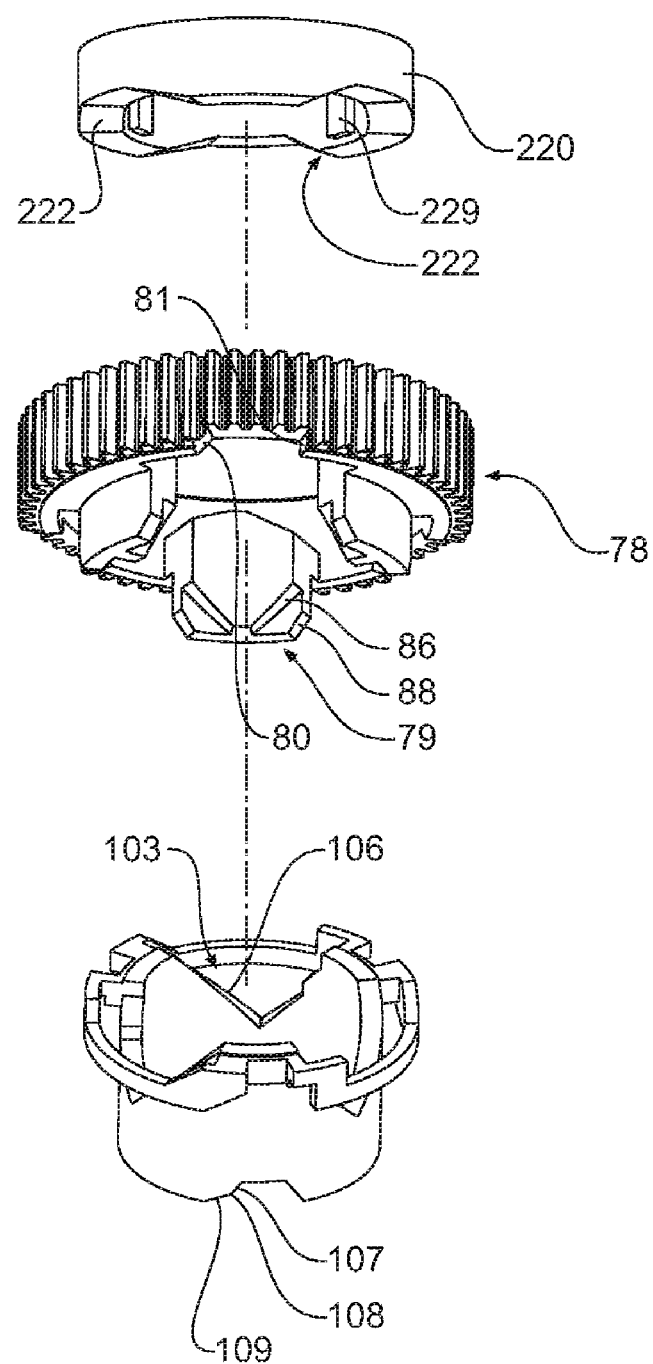
FIG. 7 is a close-up perspective view showing elements of the power fold mechanism of FIG. 6 including the drive gear.

A secondary ramp ring 220 is interposed between the primary spring 58 and the drive gear 78. The secondary ramp ring transfers spring force from the spring 58 to the drive gear 78. The helper ramps 224 of the secondary ramp ring 220 reduce the torque required to overcome the detents during electric operation. The reaction faces 222 of the secondary ramp ring transmit drive train reaction torque to the base for electric fold out (the secondary ramp ring 220 is splined to the spigot 29 by virtue of spline keys 229 most clearly shown in FIG. 7.

Referring now to FIG. 6, it can be seen that there are a number of springs aside from the primary spring 58. These springs include an electric stall spring 111 that biases the electric stall ring 110 upwards and into engagement with the drive gear 78. A manual fold spring 130 is provided to bias the manual fold ring 120 upwards and into engagement with the main ramp ring 100 (to the position shown in FIG. 9a). This spring is shown in FIG. 8a. The spring 130 includes projections 131 that act to restrain movement of the electric stall ring 110 (this is shown diagrammatically in FIG. 9a for instance). The manual fold spring 130 includes a fold 132. It is this fold 132 that biases the manual fold ring 120 upwards into engagement with the main ramp ring 100. A main ramp ring spring 101 is also provided to bias the main ramp ring 100 downwards.

Figure 5A:
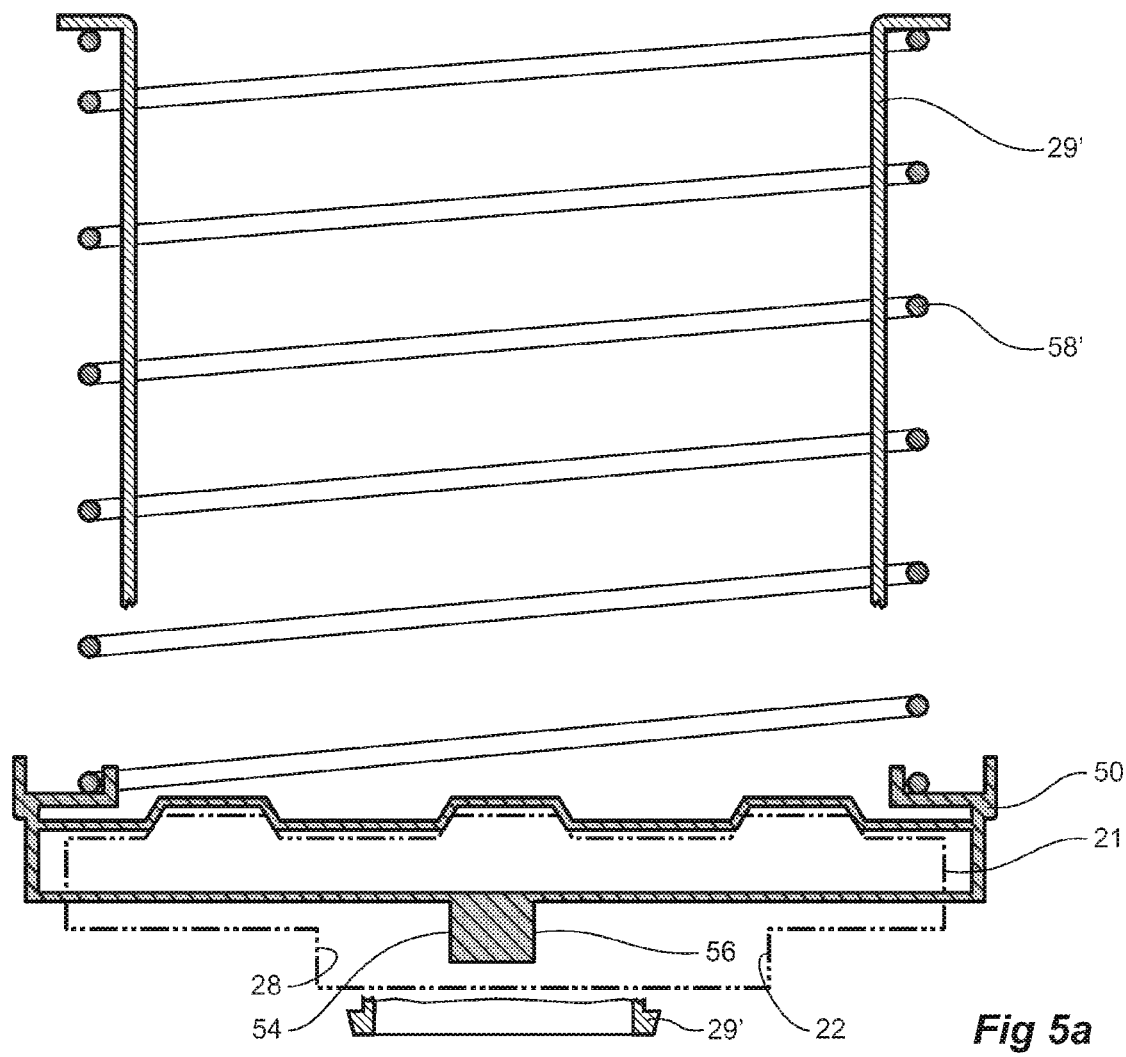
FIGS. 5a, 5b and 5c are diagrammatic views of the assembly shown in FIGS. 3 and 4.
Figure 5B:
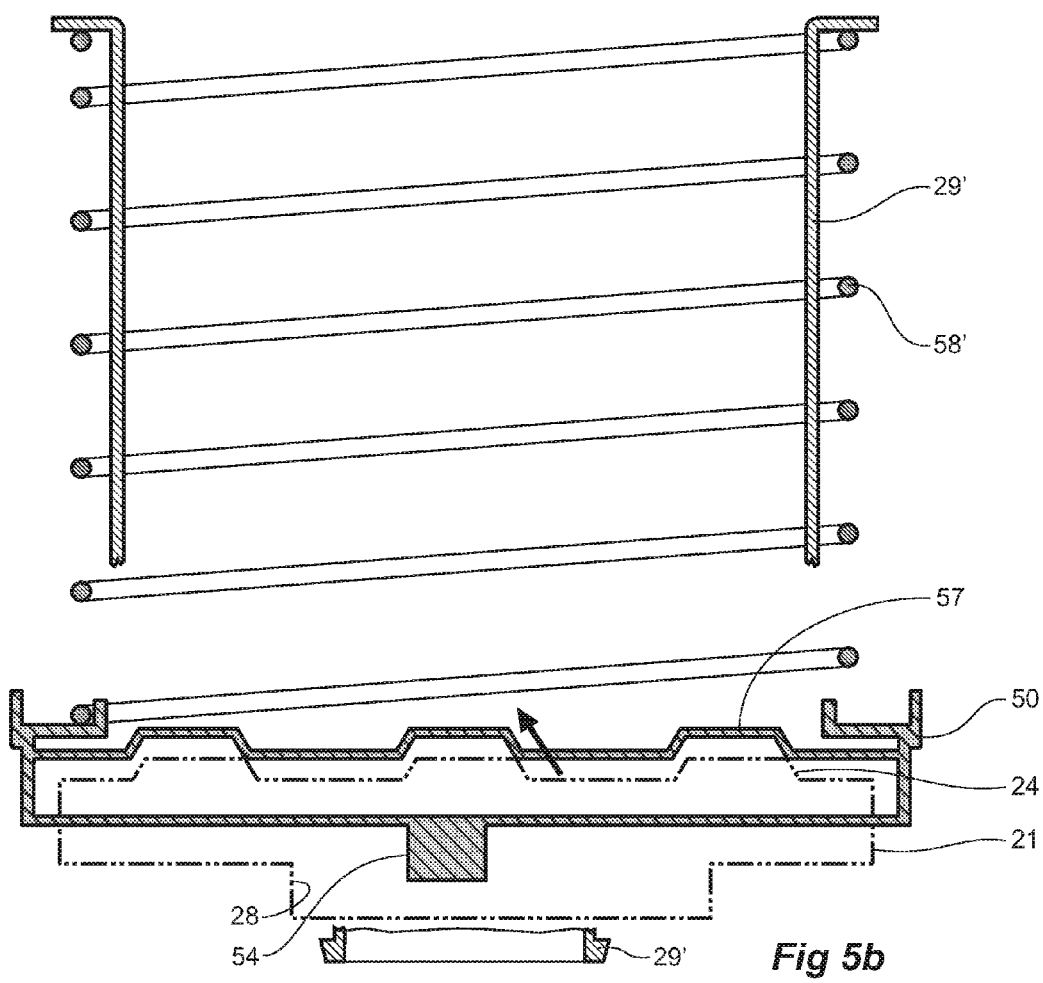
Figure 5C:
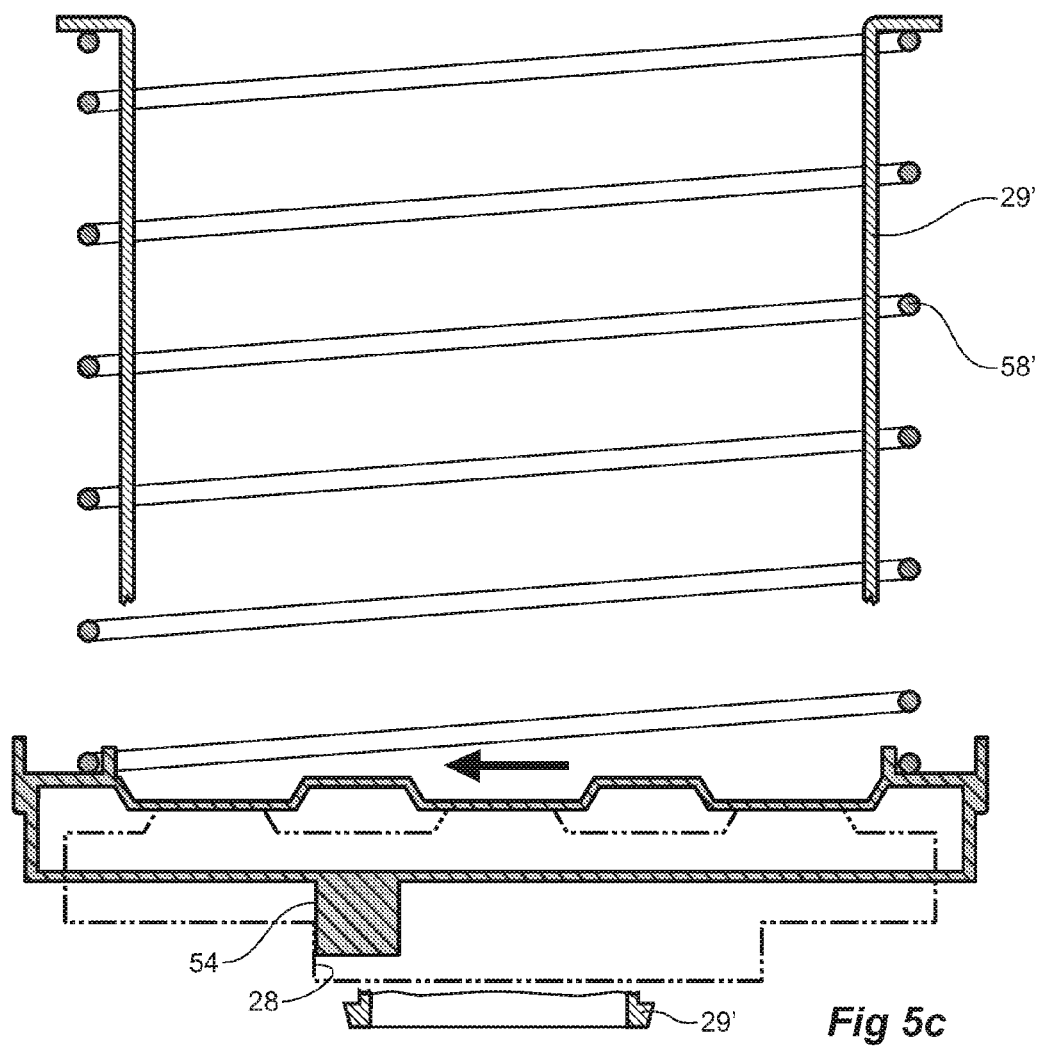
Figure 11A:
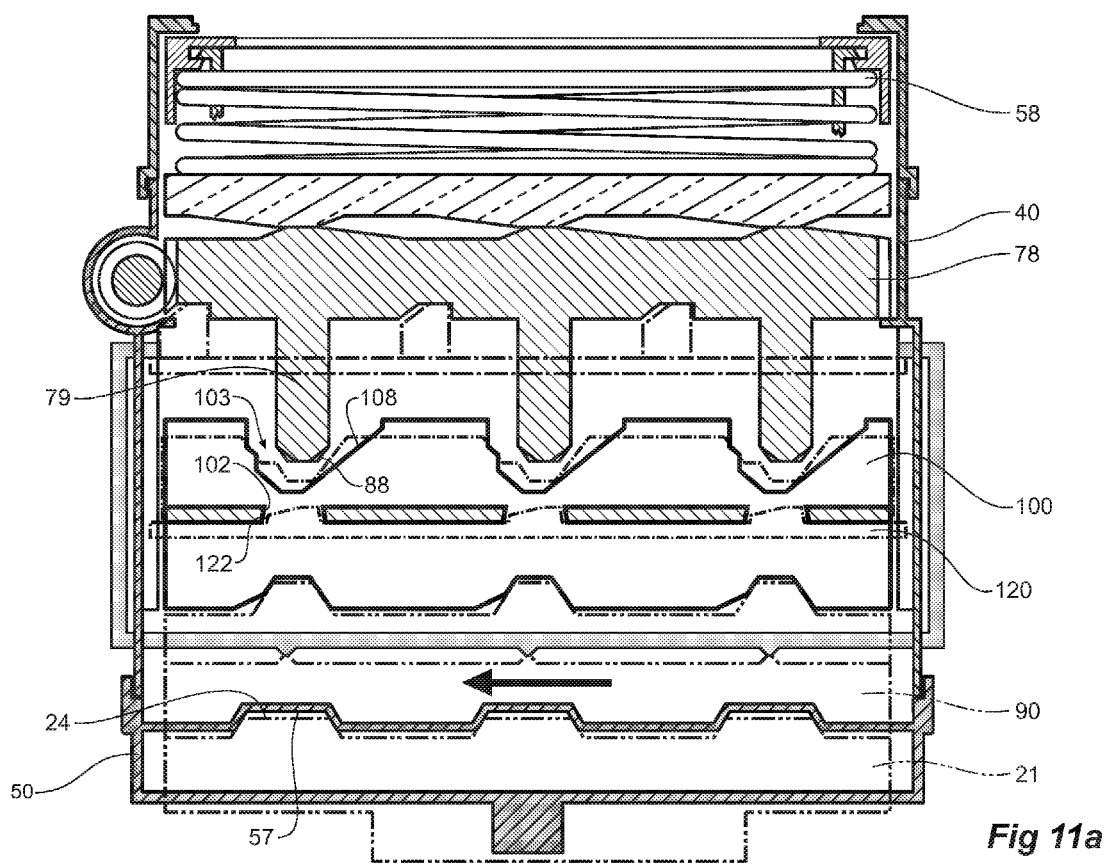
FIGS. 11a-11e are similar diagrammatic views to that of FIG. 9a but show progressive movement during manual folding of the mirror head in from its drive position to its park position.
Figure 11B:
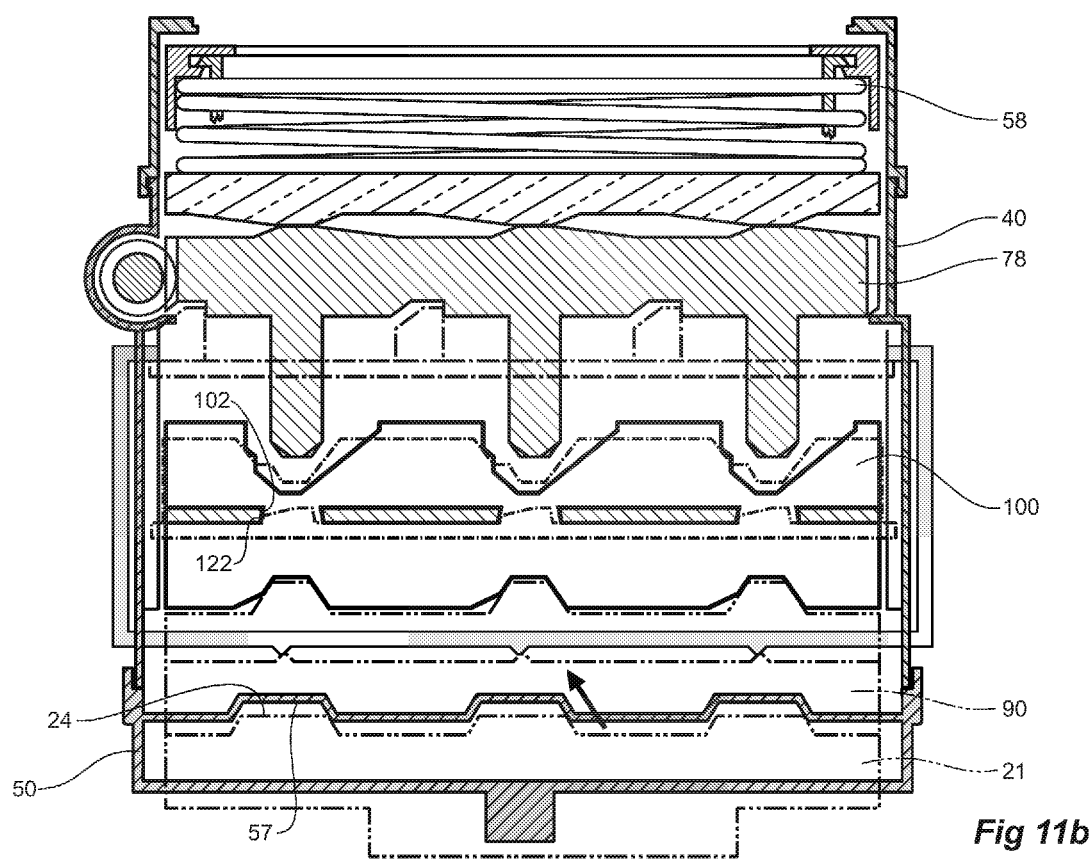

Operation of the foldable rear view mirror assembly will now be described with reference to the diagrammatic figures.
Operation of Manual Version Referring to FIG. 3 and FIGS. 5a to 5c, manual folding of the mirror head and hence frame 50 with respect to the mirror bracket and hence base 21 can be seen. As the mirror head and hence mirror frame 50 is rotated with respect to the mirror base 21, the detent features 57 on the frame 50 ride up the detent features 24 on the mirror base as is shown progressively from FIGS. 5a to 5b. As this happens, the spring 58' is compressed. FIG. 5c shows the frame park stop 54 reaching and stopping at the base rearward fold (park) end stop 28.
Operation of Powerfold Version
Manual Fold in from Drive to Park Position Operation of the external rear view mirror assembly fitted with a power fold mechanism 60 will now be described. Referring to FIGS. 1, 2 and diagrammatic FIGS. 11a to 11e, commencement of manual folding from the drive position to the park position is shown. In the transition from the position shown in FIG. 11a to the position shown in FIG. 11b, it can be seen that the frame 50 rides up the detents 57 and 24 and the clearance between the manual fold ring pushing face 122 and the main ramp ring push face 102 are taken up so that torque is transmitted from the frame 50 to the housing 40 to the manual fold ring 120 to the detent features 24 and 57 such that forces are not transmitted to the drive gear 78. This is shown diagrammatically in FIG. 9a by the fact that clearance is maintained between the protrusions 79 of the drive gear 78 within the recesses 103 within the main ramp ring 100.

Figure 11C:
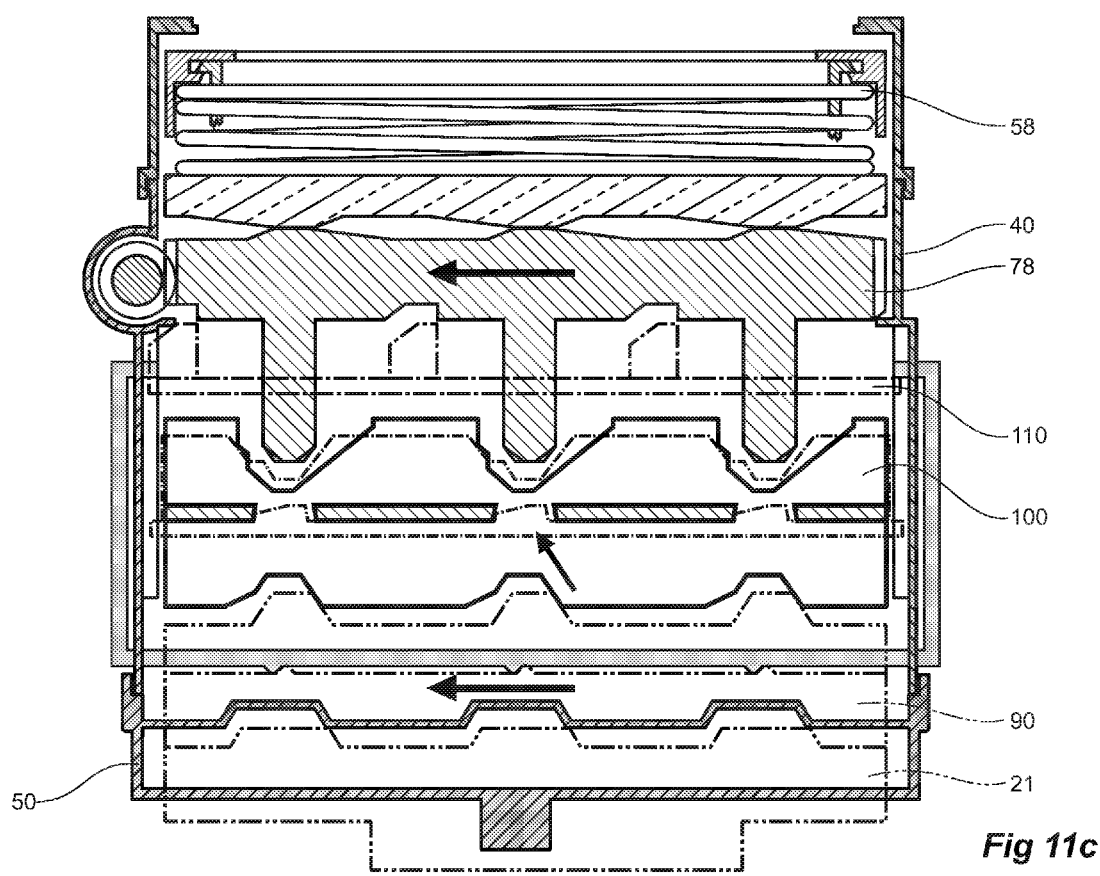

In FIG. 11c, it can be seen that the main ramp ring 100 has moved up inside the power fold mechanism without contacting the gear drive 78 or its protrusions 79. Furthermore, it can be seen that the electric stall ring 110 has disengaged from the drive gear 78 for subsequent electric function.

Figure 11D:
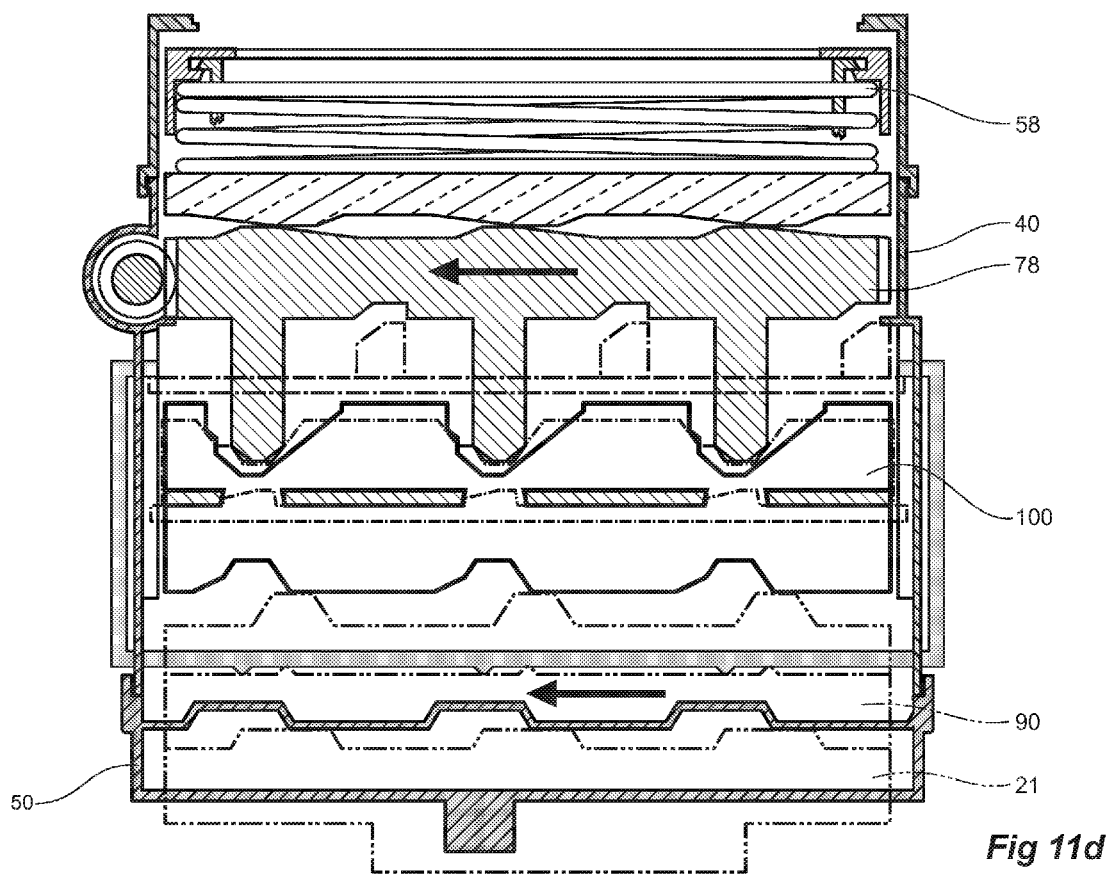
Figure 11E:
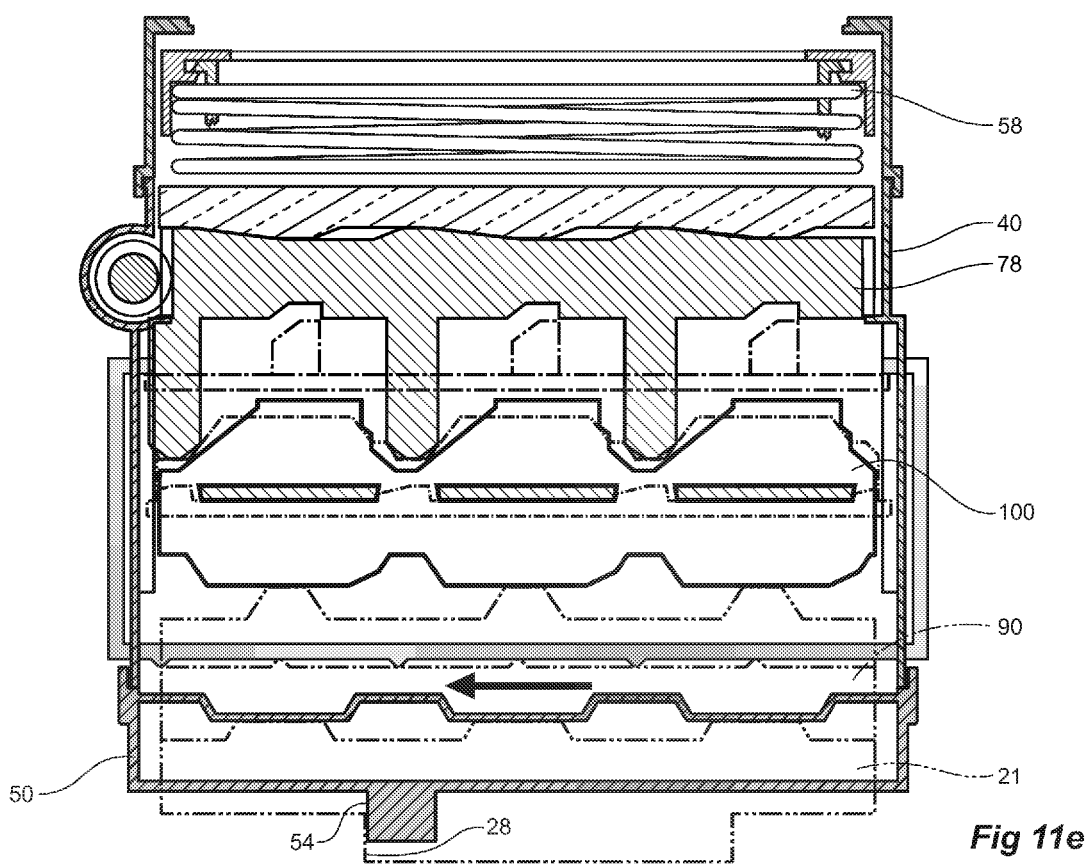
Figure 12A:
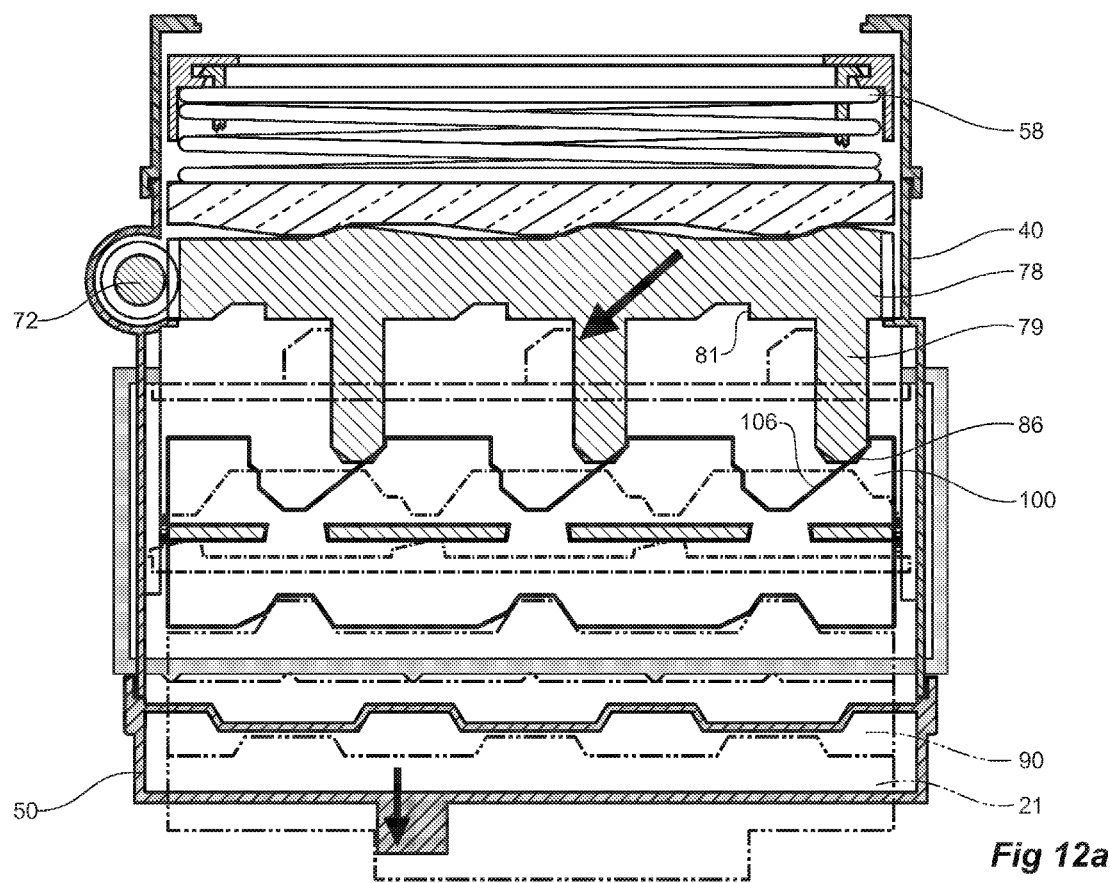
FIGS. 12a-12e are similar diagrammatic views to that of FIG. 9a but show progressive movement during electric folding from its drive position to its park position.

In FIG. 11d, it can be seen that the frame 50 continues to rotate towards the park position and, finally, in FIG. 11e, the frame 50 reaches the park position when the end stop 28 is contacted.
Electric Fold Out from the Park to Drive Position Referring now to FIGS. 12a to 12e, electric fold out from the park position to the drive (or deployed) position will now be described. Referring first to FIG. 12a, power is applied to the motor 75 which results in torque at the worm gear 72. Worm gear 72 meshes with drive gear 78 and rotates gear drive 78 down the main ramp ring 100 thereby lowering the frame 50 down towards the base 21. More specifically, the drive gear main ramp 86 (most clearly shown in FIG. 7) rides down the corresponding main ramp ring 106 as is shown progressively in FIGS. 12*a* and 12*b*.

Figure 12B:
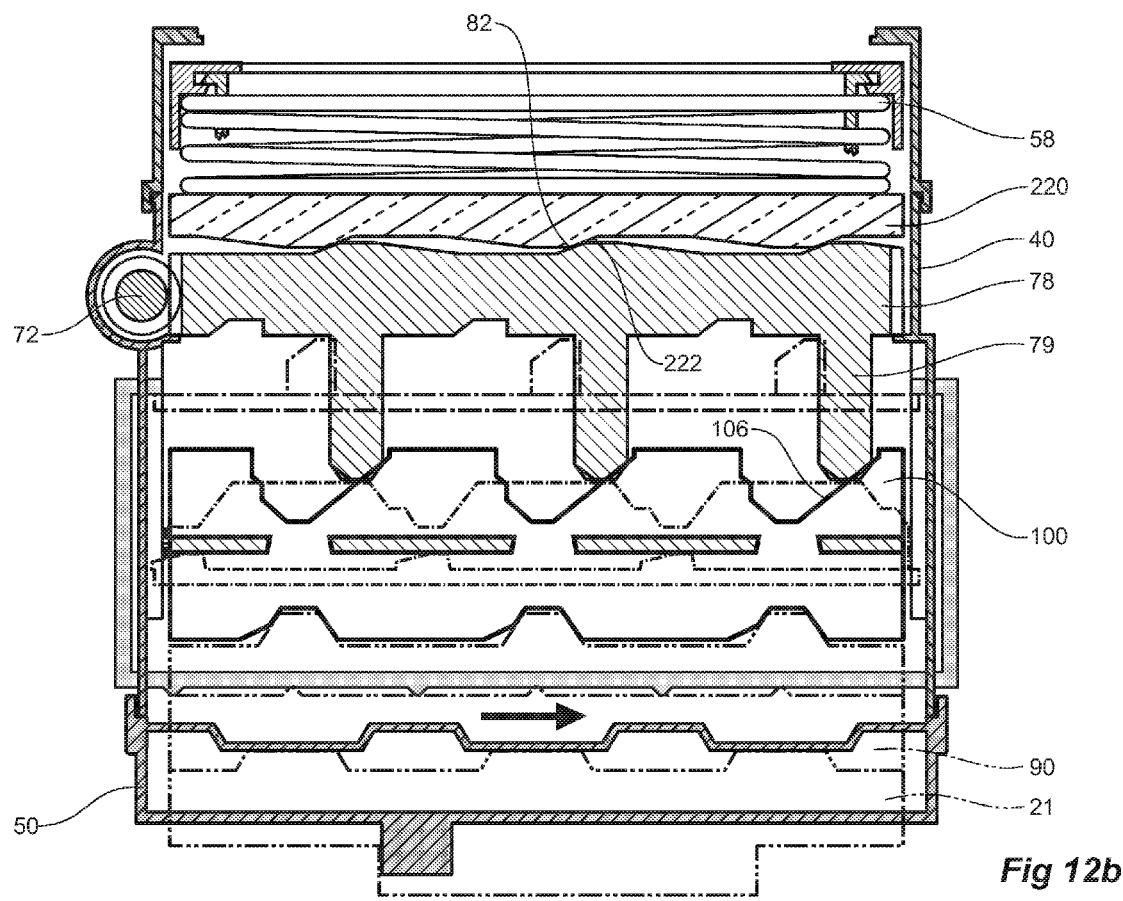

A reaction torque stopping rotation of the drive gear 78 is created at the interface of the reaction face 82 of the drive gear 78 with the reaction face 222 of the secondary ramp ring 220 as illustrated in FIG. 12*b*. With the drive gear 78 now held from further movement with respect to the secondary ramp ring 220 and hence the base 21, the worm gear 72 and hence the housing 40, the frame 50 and the entire mirror head 51 rotates with respect to the base 21 as is illustrated in the transition from FIG. 12*b* to 12*c*.

Figure 12C:
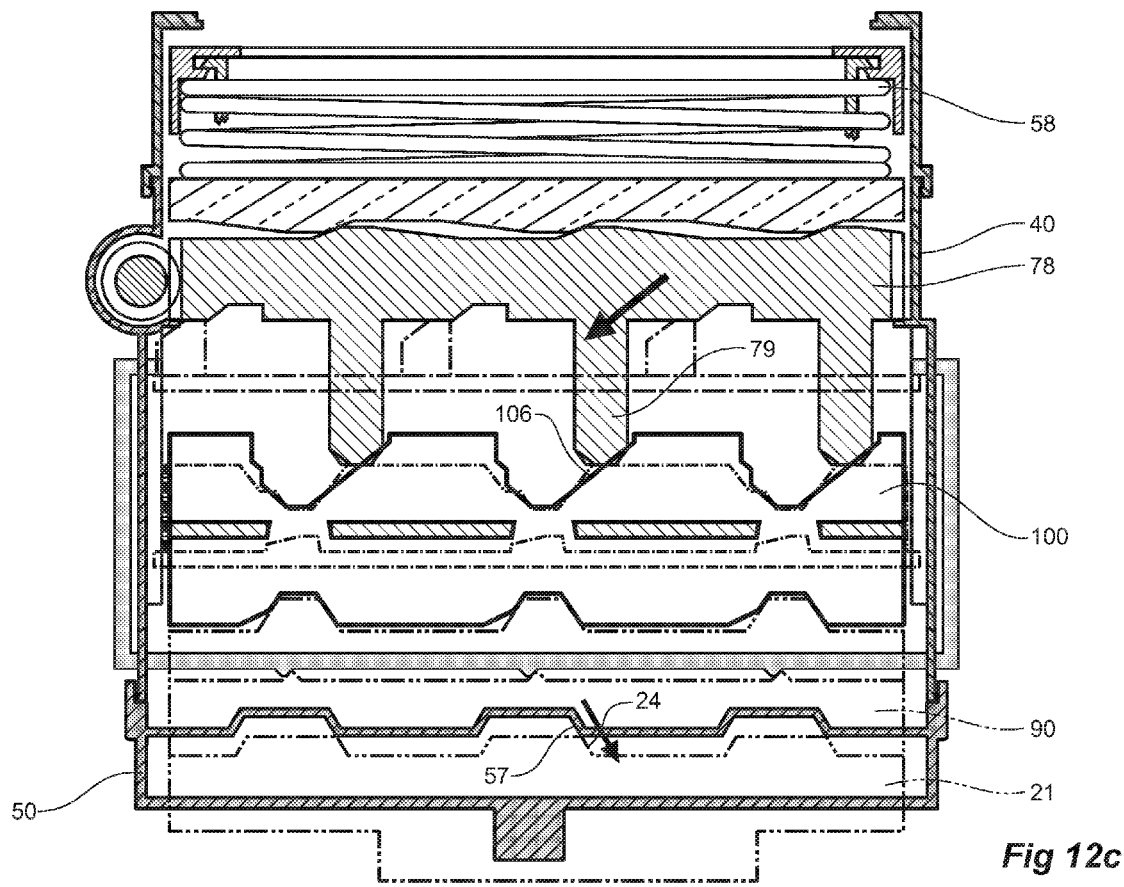
Figure 12D:
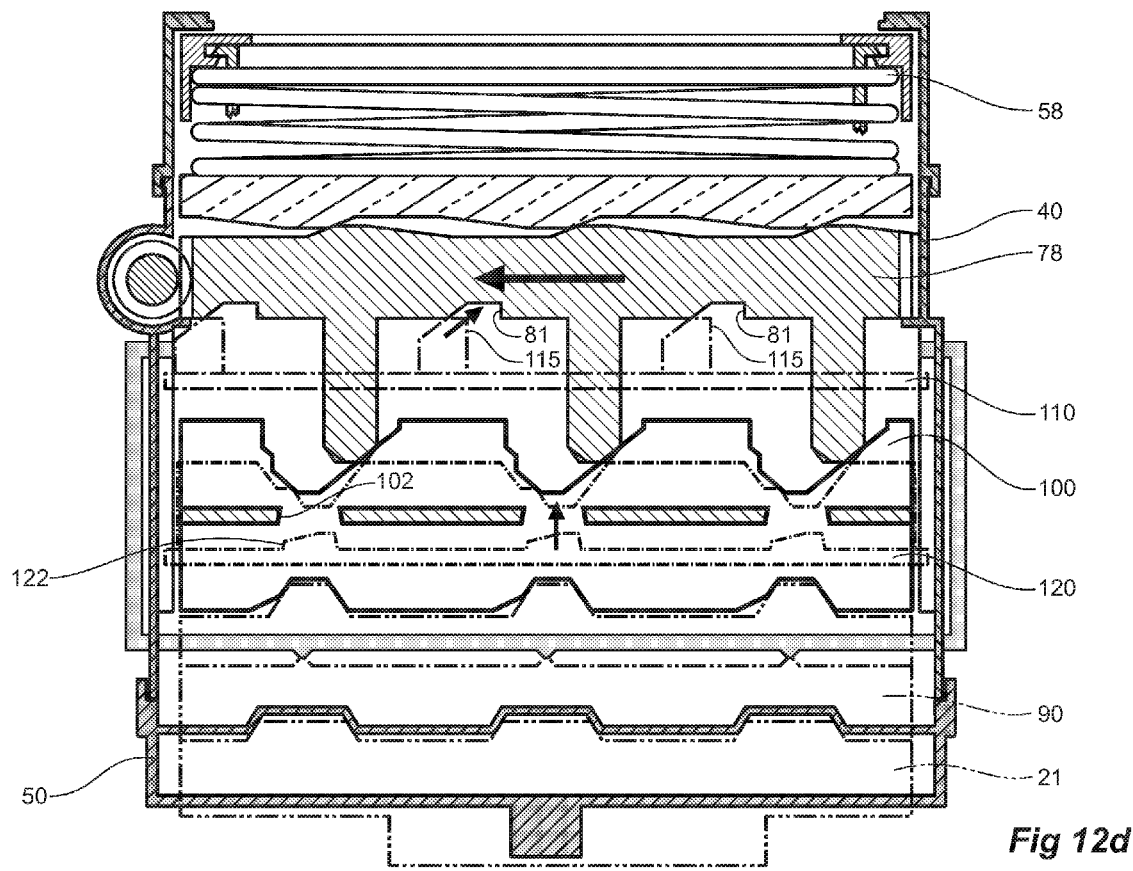
Figure 12E:
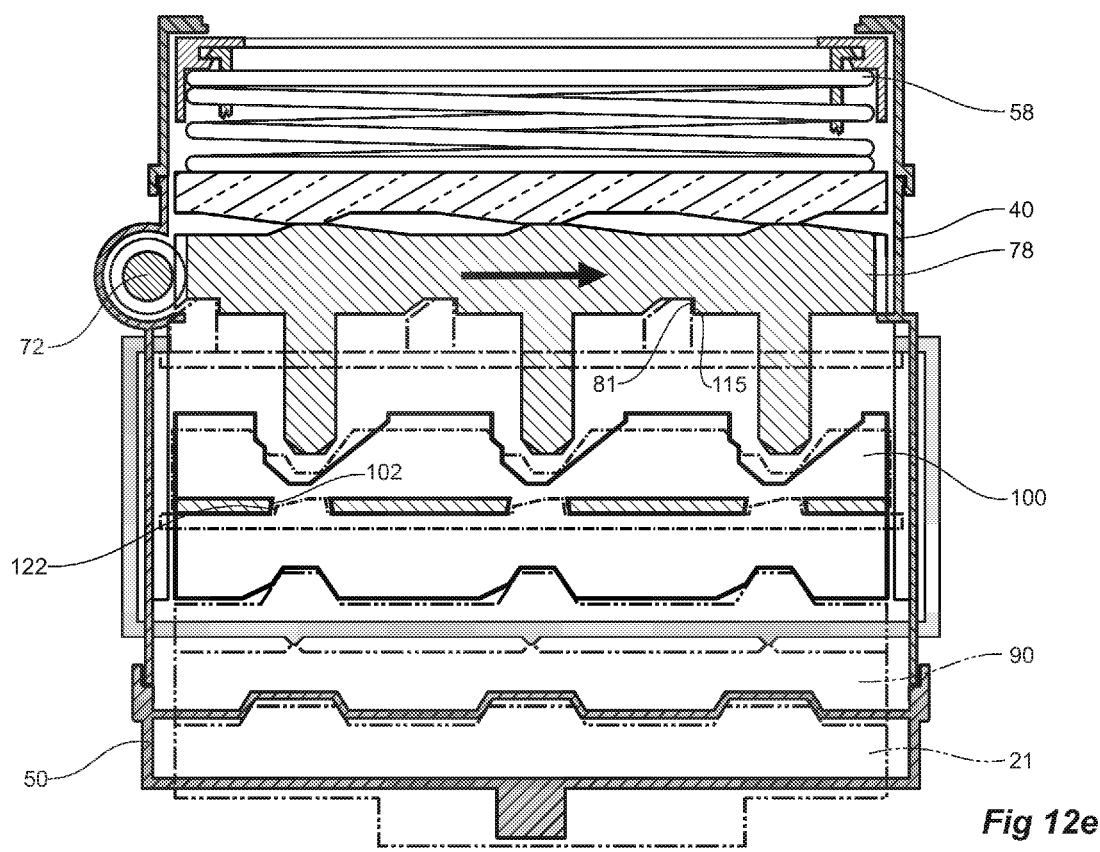

In FIG. 12*c* it can be seen that the frame 50 is reaching the detent form by detent features 57 and 24. In the transition from FIG. 12*c* to FIG. 12*d*, it can be seen that the frame 50 fully engages the detents and then, with the detents holding the frame 50 against further movement with respect to the base 21, the drive gear 78 rotates with respect to the housing 40 such that the electric stall ring 110 and the manual fold ring 120 both re-engage. More specifically, the electric stall ring stop 115 engages the drive gear electric fold ring stop 81 as is shown progressively from FIG. 12*d* to 12*e*. At the same time, the manual fold ring pushing face 122 moves up into position adjacent the main ramp ring push face 102, leaving the mechanism stalled in the drive position shown in FIG. 12*e*.

Electric Fold in from the Drive to Park Position

Figure 13A:
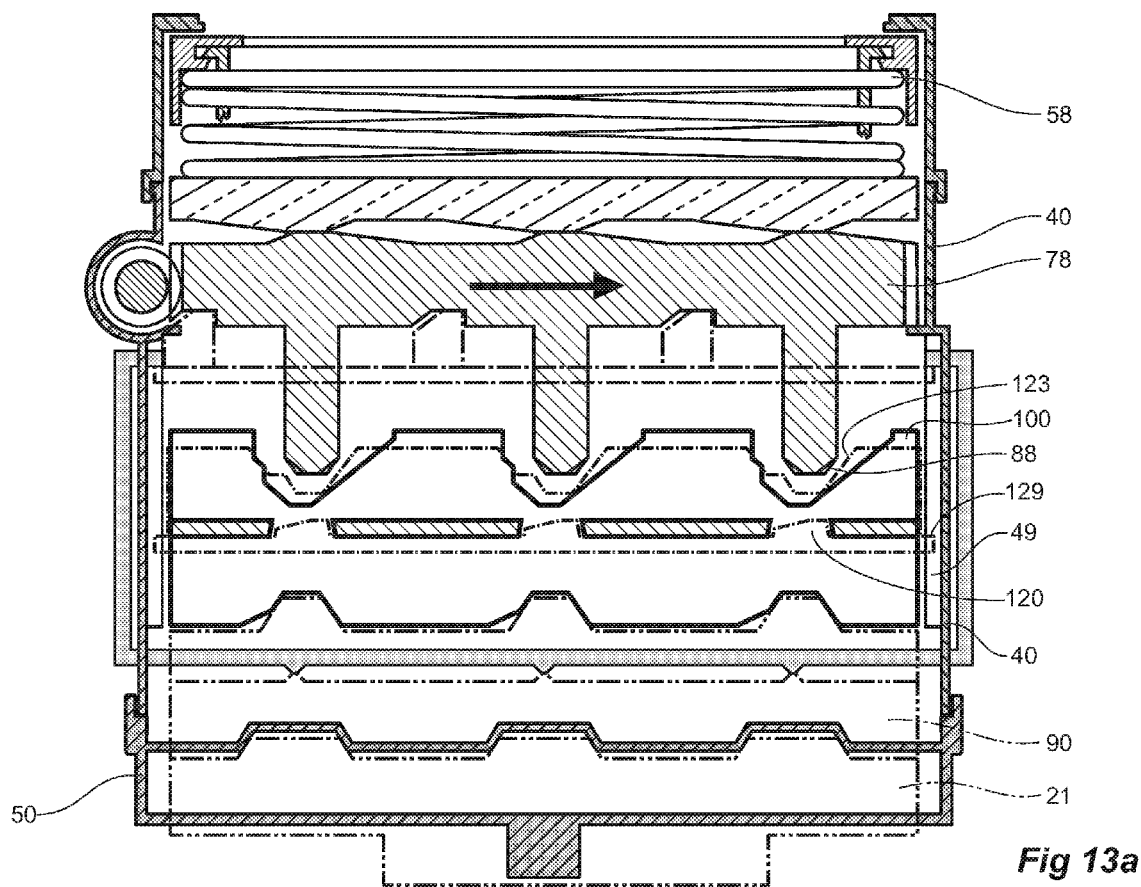
FIGS. 13a-13f are similar diagrammatic views to that of FIG. 9a but show progressive movement during electric folding of the mirror head in from its park position to the drive or deployed position.
Figure 13B:
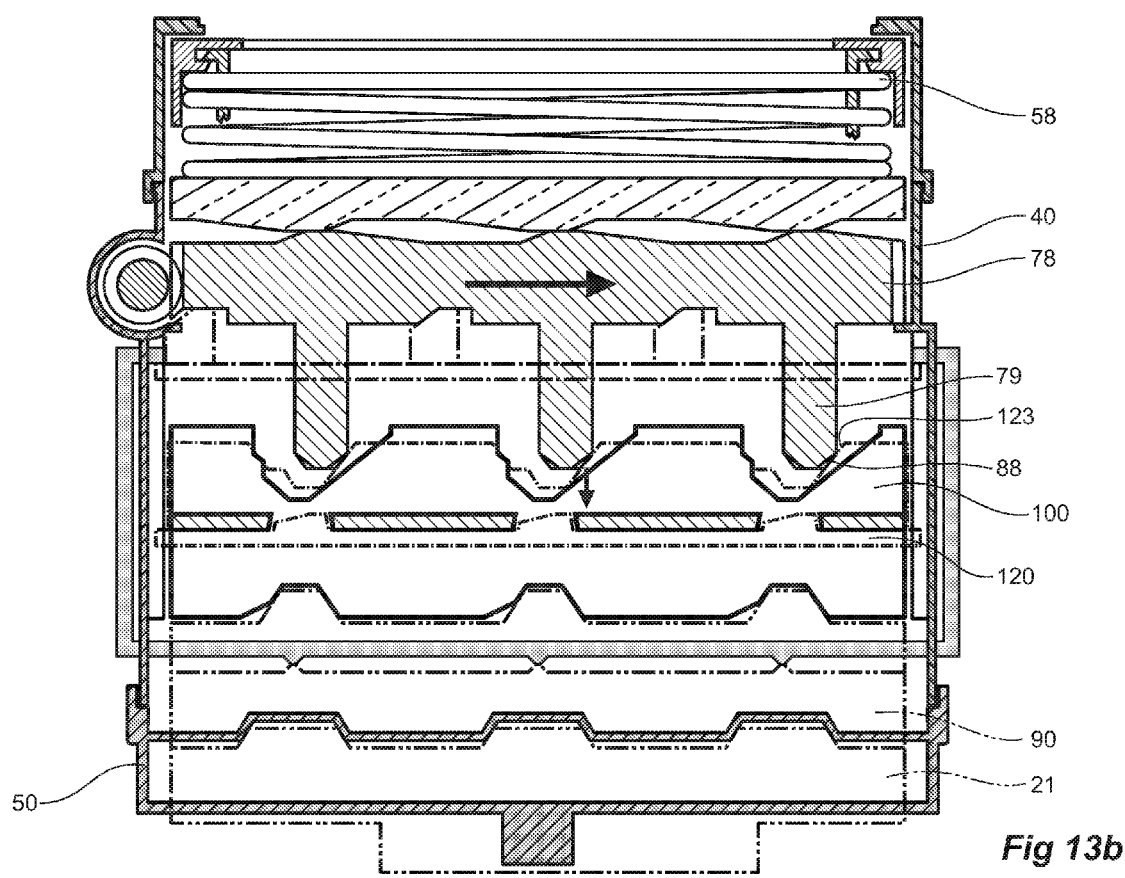

Referring now to FIGS. 13*a* to 13*f*, electric fold in from the drive to the park position will now be described. Referring first to FIG. 13*a*, power is applied to the motor 75 causing the worm gear 72 to rotate the drive gear 78. It can be seen in FIG. 13*b* that the ramp 88 on the protrusion 79 of the drive gear 78 has reached the ramp 123 of the manual fold ring 120. As the drive gear 78 continues to rotate with respect to the housing and hence the manual fold ring 120, it starts to push the manual fold ring 120 downwards against the weak spring force provided by the manual fold spring 130 most clearly shown diagrammatically in FIG. 9*b*.

Figure 13C:
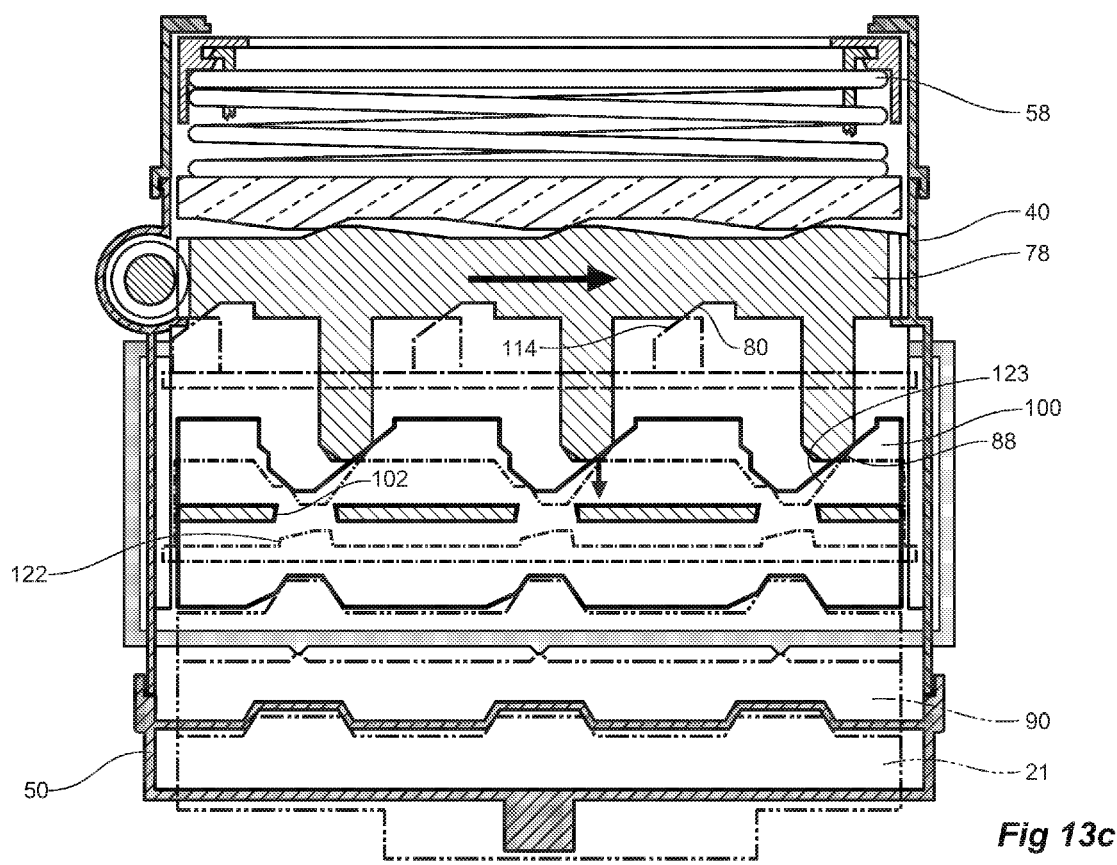

Referring now to FIG. 13*c*, it can be seen that the manual fold ring 120 has disengaged from the main ramp ring so that the manual fold ring 120 is effectively no longer splined or otherwise locked to rotate with the housing 40.

Figure 13D:
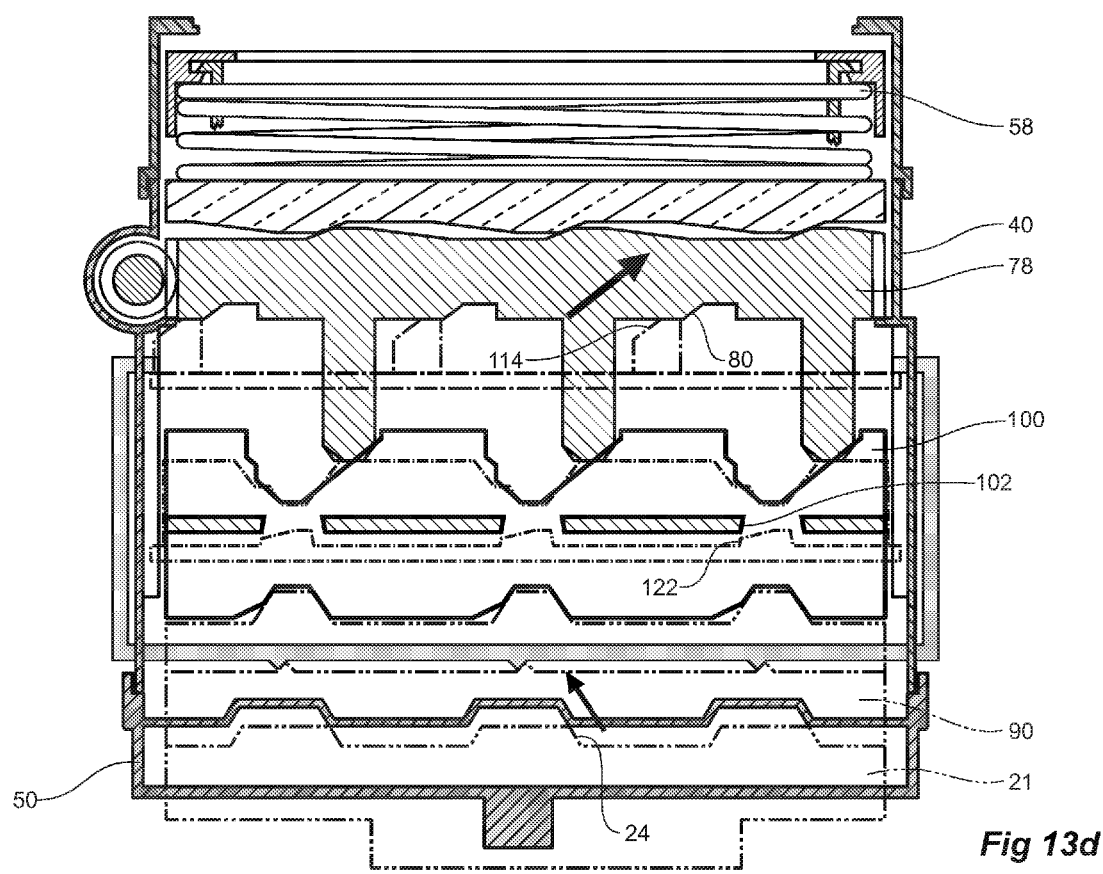

In the transition from FIG. 13*c* to 13*d* it can be seen that the drive gear 78 goes up the main ramp ring as the frame 50 slides up the detents 24 on the base 21.

Figure 13E:
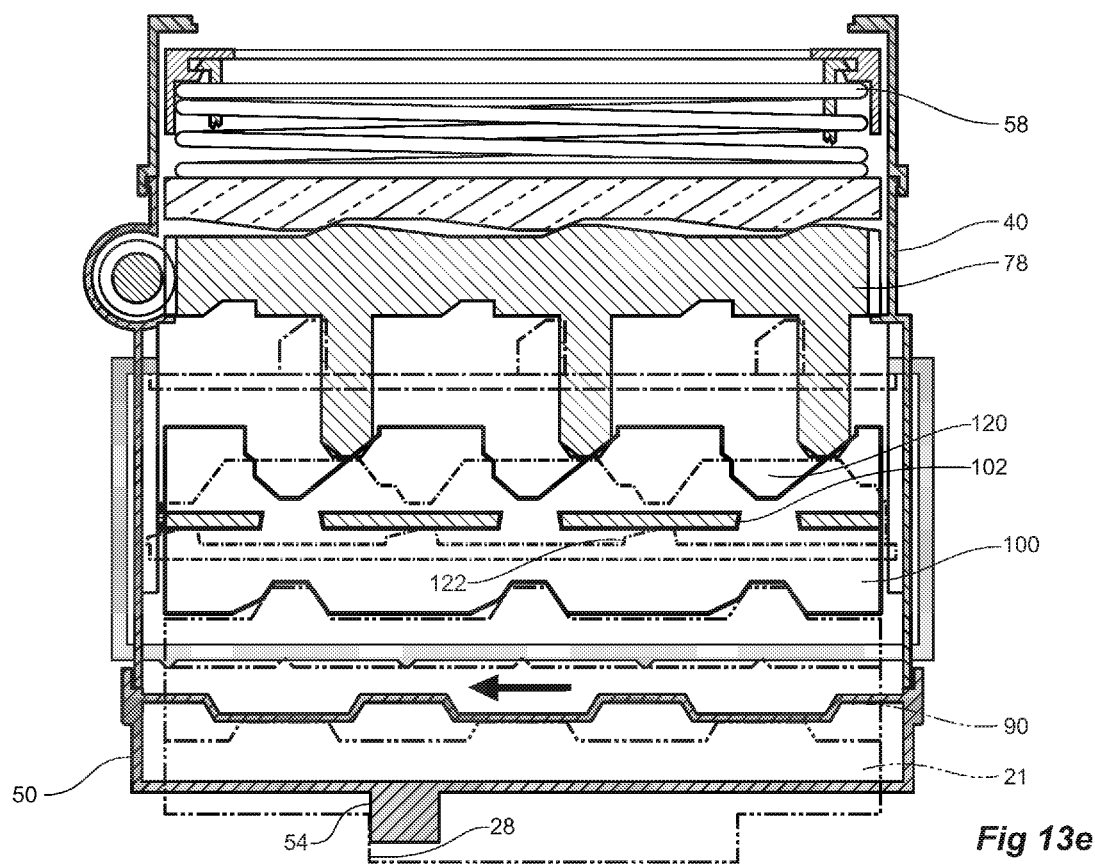
Figure 13F:
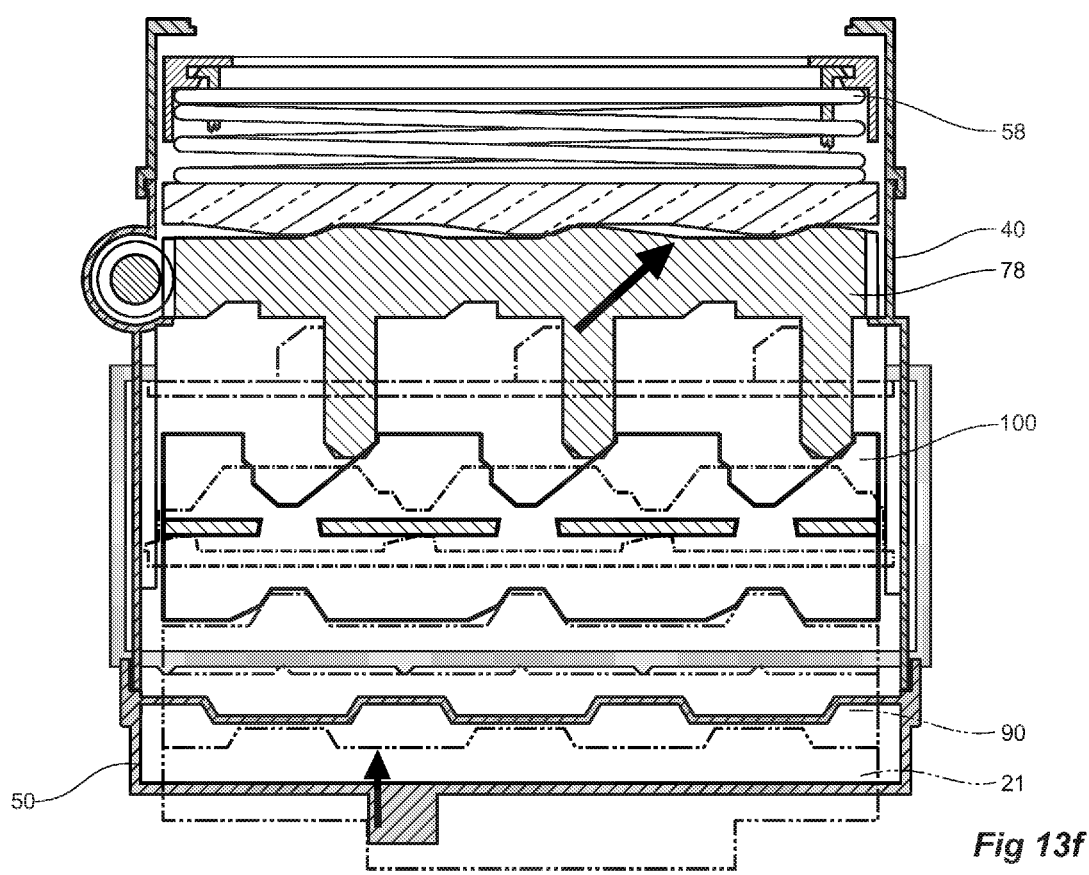

FIG. 13*e* shows the park stop 54 of the frame 50 reaching the base rearward folds (park) end stop 28. Finally, in the transition from FIG. 13*e* to 13*f* it can be seen that the drive gear 78 rides up the main ramp ring 100 to take up any manufacturing clearances or tolerances lifting the frame 50 up and stalling the mechanism in a position shown in FIG. 13*f*.

Manual Fold Out after Electric Fold in (Manual Re-Deploy)

Figure 14A:
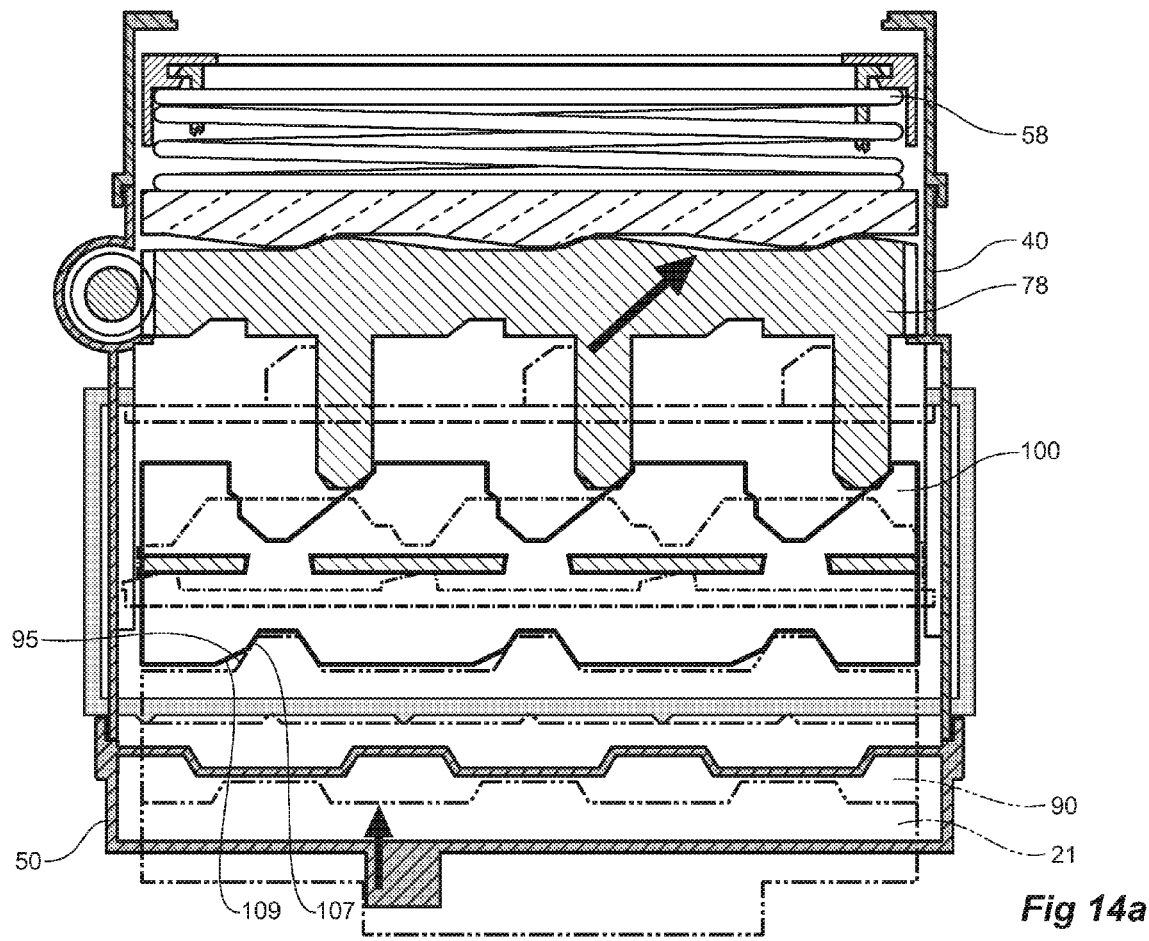
Figure 14B:
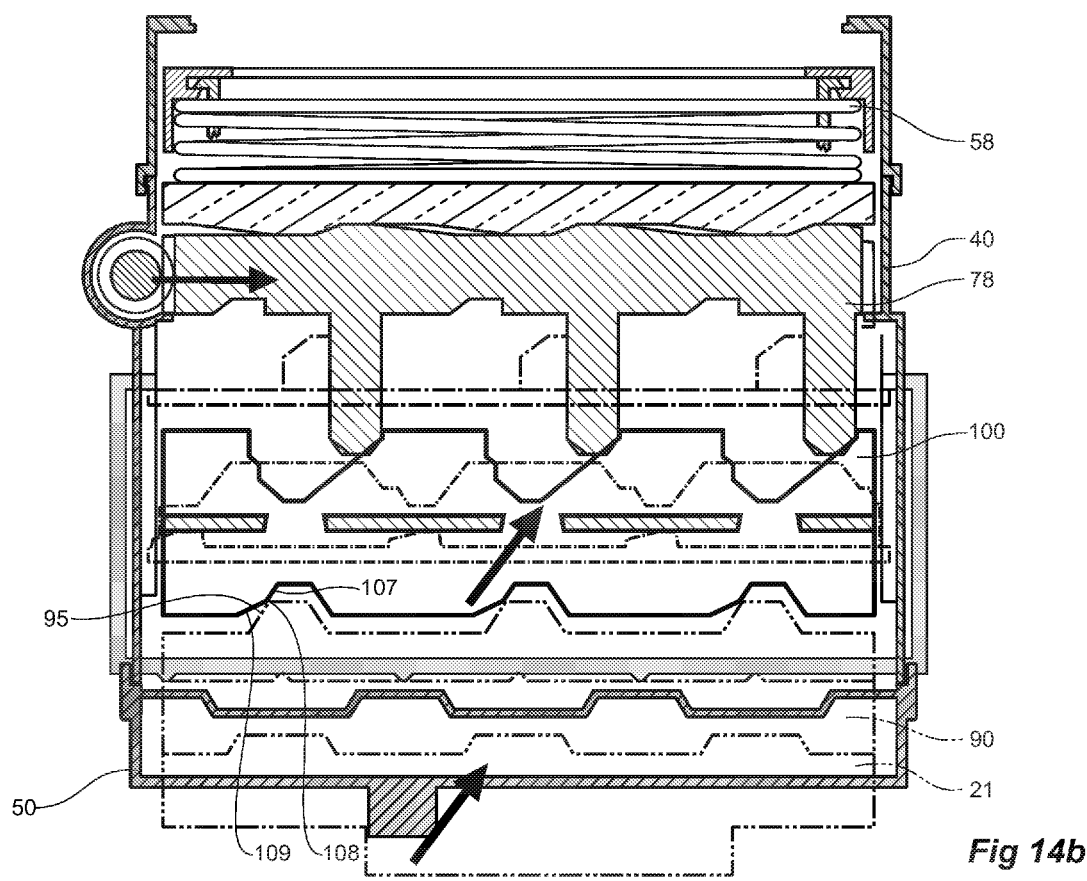

Referring now to FIGS. 14*a* to 14*e*, manual fold out of the mirror head back to the drive position after electric fold in will now be described. Referring first to FIGS. 14*a* and 14*b*, as a person pushes on the mirror head 51 and therefore the frame 50, this produces a force on the worm gear 72 which in turn pushes against the drive gear 78. Given that the main ramp ring is at this point engaged with the main ramp ring 100, the ramp ring 100 rides up the steep clutch ramp 107 until the knee 108 is reached as is shown in FIG. 14*b*. In the transition from 14*b* to 14*c*, it can be seen that the main ramp ring 100 now moves up under the action of spring 104 most clearly shown in FIG. 9*b*. [CHECK WITH CLIENT—does the spring 101 or 104 bias the main ramp ring 100 upwards or downwards?].

Figure 14C:
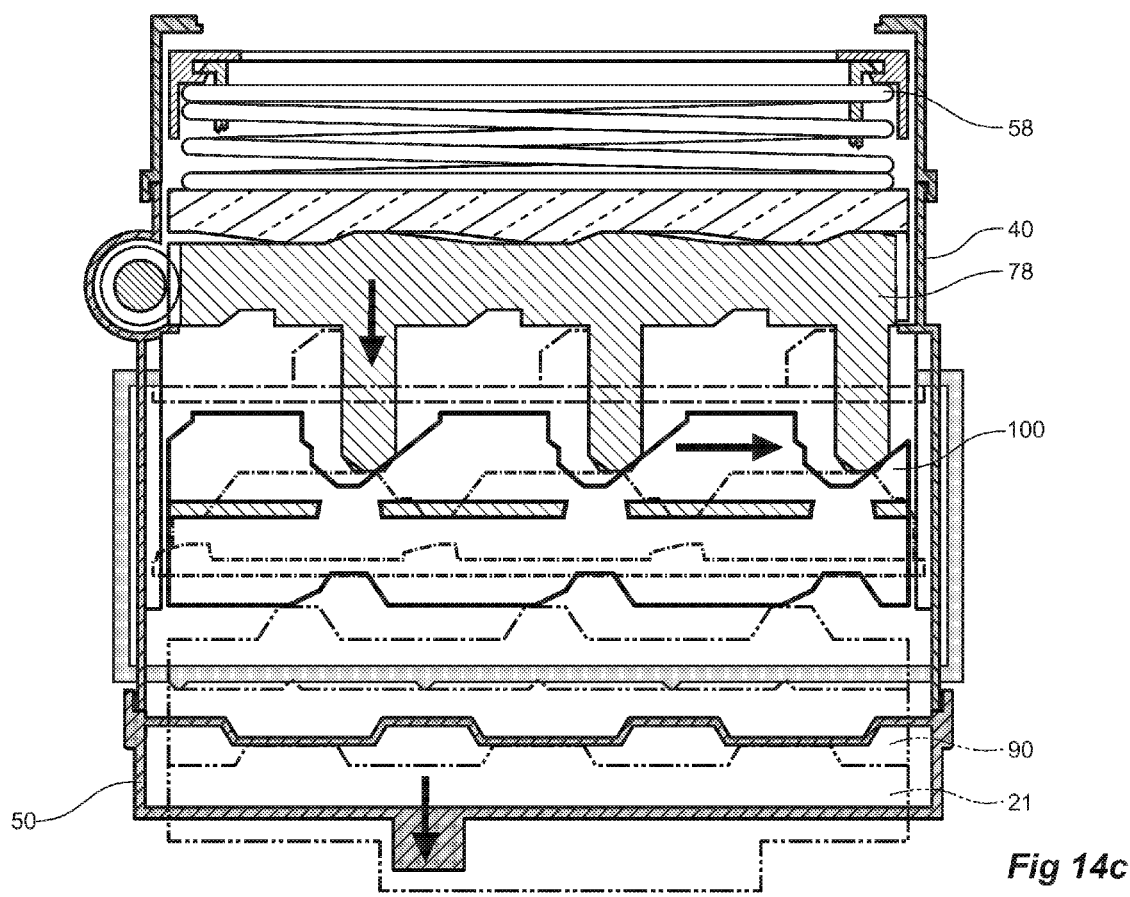

As the main ramp ring 100 moves upwards, it also moves forward as indicated by the arrow in FIG. 14*c*.

Figure 14D:
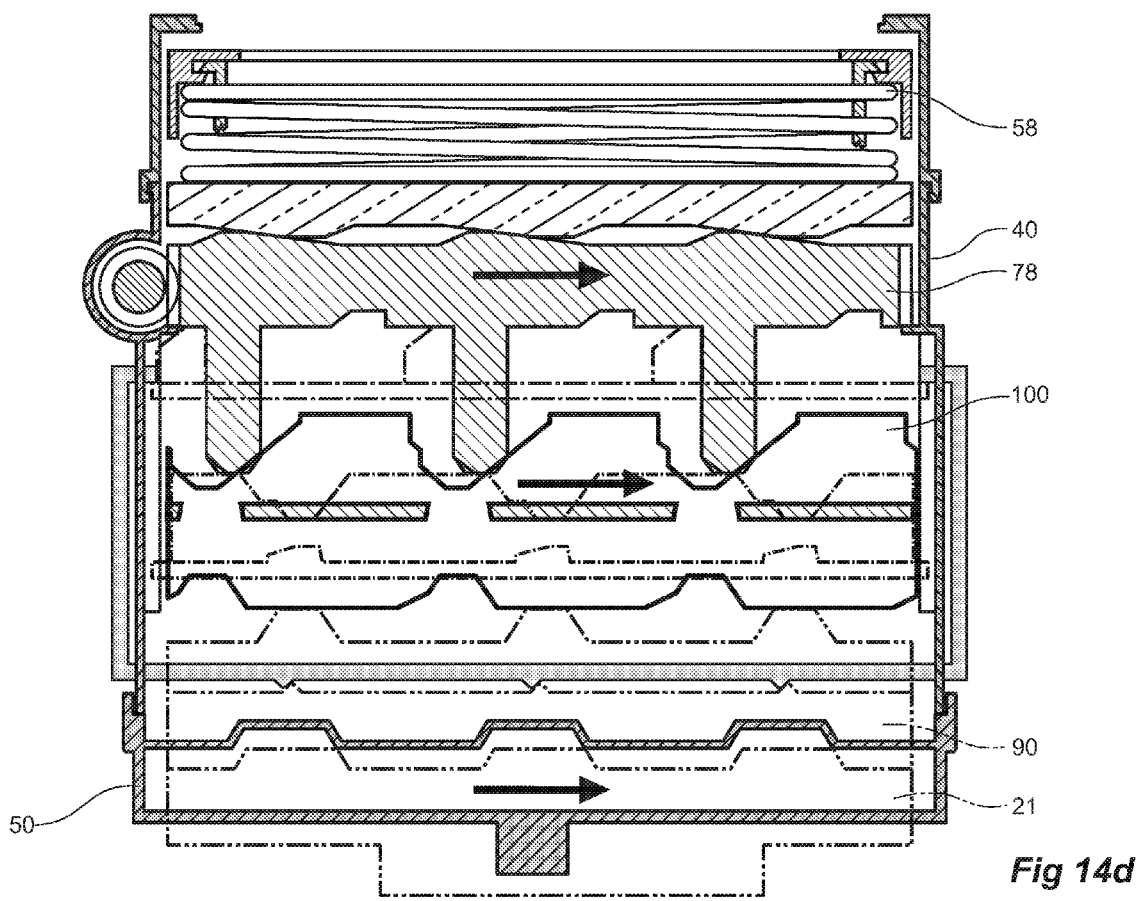
Figure 14E:
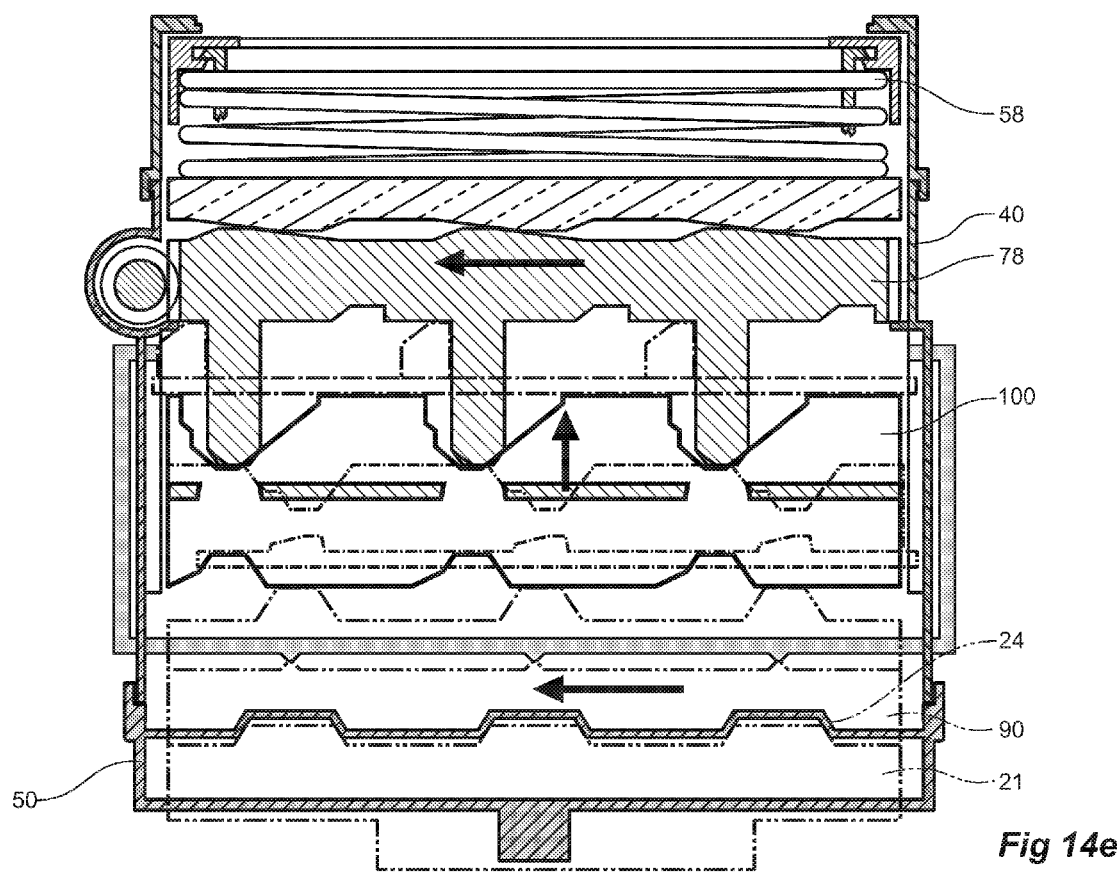

With the clutch now disengaged, the frame 50 rotates to the drive position as is shown progressively from FIGS. 14*c* to 14*e*. In FIG. 14*e*, the detents 24 and 57 can be seen re-engaging. The main ramp ring 100 also moves further upwards.

Alternative Manual Fold Torque Transmission Member

Figure 10A:
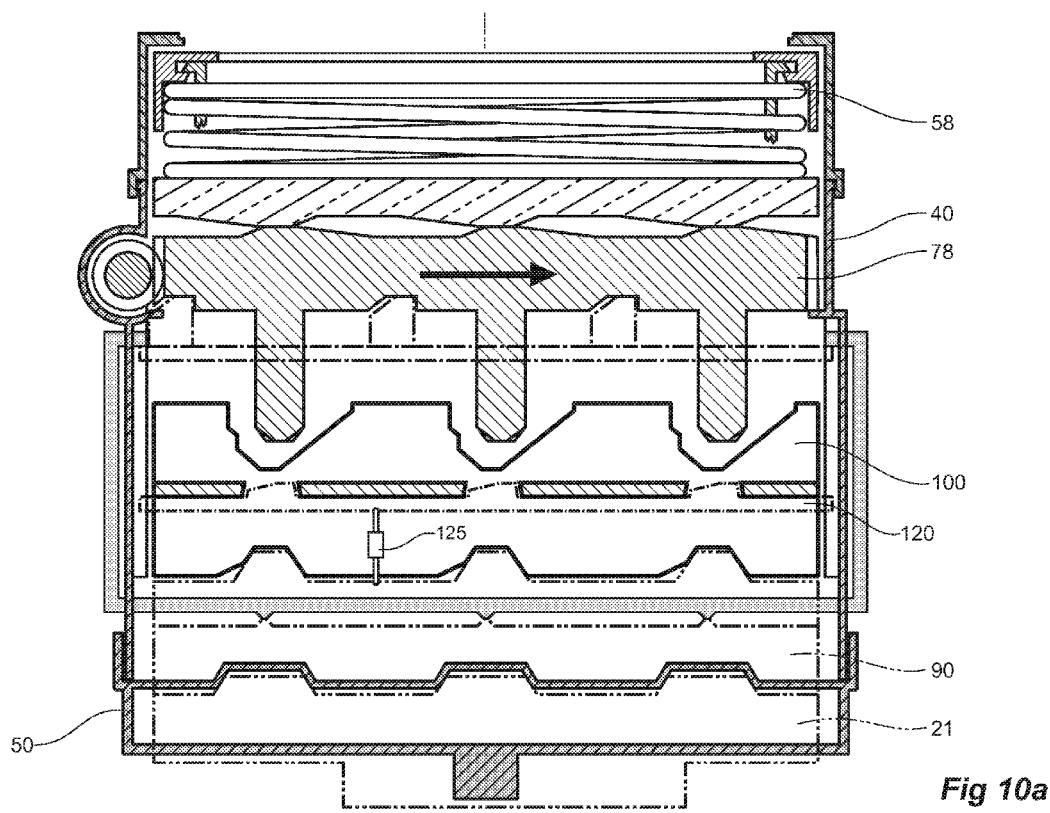
FIG. 10a is a similar view to that of FIG. 9a but shows an alternative embodiment of a manual fold ring having a solenoid actuator.

Referring now to FIG. 10*a* an alternative manual fold torque transmission member is shown. With this alternative, an actuator 125 is provided. This actuator performs the same function that the ramp 123 performs in the manual fold ring 120 described with reference to FIG. 13*a* for instance. That is, the actuator 125 actuates the manual fold torque transmission member 120 upwards and downwards so as to engage or disengage it with the main ramp ring 100.

Alternative Electric Stall Ring

Figure 10B:
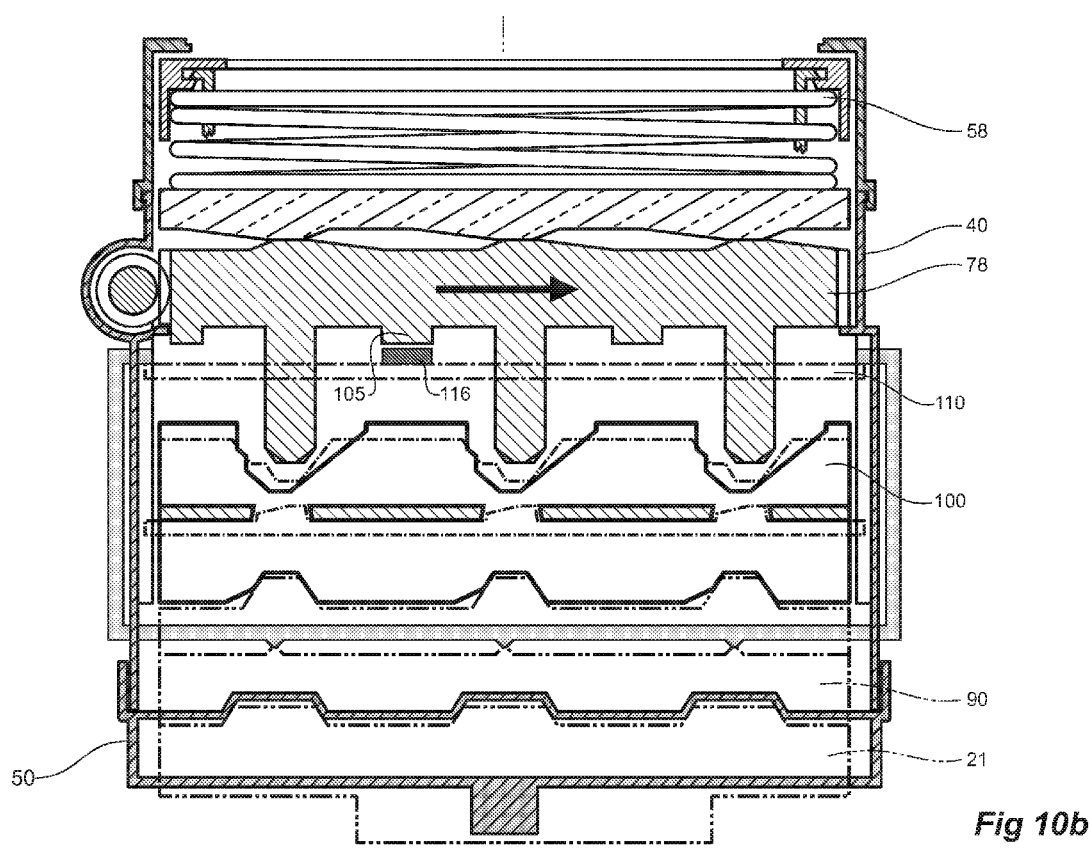
FIG. 10b is a similar view to that of FIGS. 9a and 10 but shows an alternative electric stall ring, the electric stall ring incorporating a sensor.

Referring now to FIG. 10*b*, an alternative electric stall system 110 is shown. With this alternative, the relative rotational positions between the drive gear 78 and the electric fold ring 110 is sensed through elements 105 and 116 as shown in FIG. 10*b*. Sensor elements 105 and 116 (which may include a limit switch) replace the electric stall ring ramps and stops 114 and 115 shown in FIG. 8*a*. This alternative electric stall system detects a relative rotational position between the housing 40 and the drive gear 78 and stalls the drive gear 78 by cutting power to the motor in the position shown in FIG. 12*e*.

With the embodiment of the invention described, a conventional manual fold detent system is used which enhances vibration performance and manual folding functions. Furthermore, because the power fold drive train is only operably connected between the frame 50 and base 21 during electric operation, all loads, including wind load, road transmitted loads, and static loads are transferred from the frame 50 to the base 21 through the manual detent system and the power fold mechanism is isolated from these loads. As a result, the power fold drive train and other components do not have the same strength and rigidity requirements of a conventional power fold system.

The operating logic of the power folding system described above is improved compared to prior art folding mirror heads. Combinations of manual and electric folding functions behave as expected, with the mirror head and frame being able to be returned to the drive position in one or two activations of a vehicle cabin mounted switch.

The provision of a park position detent that engages after manual fold in is a useful, but not essential feature as it positively holds the mirror in the parked position. This is important during car washing and during loading of vehicles onto trucks, trains or other vehicles.

The fold system described above has good vibration performance including after it has been manually folded to the drive position. Clutch reset is logical and does not result in clunking noise. There are no delays caused by clutch reset.

Having the electric folding mechanism out of the load path (other than when electrically actuating the mirror head) results in identical performance for both manual and power fold systems. This is in stark contrast to most power fold systems in which there is a summing of torques from both the manual and power fold systems during at least some manual operations.

While the present invention has been described in terms of preferred embodiments in order to facilitate better understanding of the invention, it should be appreciated that various modifications can be made without departing from the principles of the invention. Therefore, the invention should be understood to include all such modifications within its scope.

| Legend: | |
|---|---|
| No. | Description |
| 10 | Fold Mechanism |
| 20 | Mirror Bracket |
| 21 | Mirror Base |
| 22 | Base forward fold End Stop |
| 24 | Detent Feature |
| 25 | Detent Circle (FIG. 8c) |
| 28 | Base rearward fold (park) end stop |
| 29 | Spigot |
| 30 | Spigot Retainer |
| 31 | |
| 32 | Spigot Keyway |
| 35 | Mirror Aesthetic Cover |
| 38 | Mirror Motor Mechanism |
| 39 | Mirror Mount/Mirror |
| 40 | Power Fold Housing |
| 41 | |
| 42 | Power Fold Housing Cover |
| 43 | Power Fold Housing Cover Cap |
| 49 | Spline Keyway (Keilnut) |
| 50 | Case Frame |
| 51 | Mirror Head |
| 52 | Detent Feature |
| 53 | Mirror Head Axis |
| 54 | Frame Park Stop |
| 56 | Frame Forward Stop |
| 57 | Detent Feature in Frame |
| 58 | Spring |
| 59 | Aperture |
| 60 | Power Fold Mechanism |
| 61 | |
| 62 | Power Fold Mechanism Housing |
| 70 | Drive Train |
| 71 | |
| 72 | Worm Gear |
| 75 | Motor |
| 78 | Drive Gear |
| 79 | Protrusion |
| 80 | Drive Gear Electric Fold Ring Ramp |
| 81 | Drive Gear Electric Fold Ring Stop |
| 82 | Drive Gear Helper Ramp Reaction Face |
| 83 | |
| 84 | Drive Gear Helper Ramp |
| 86 | Drive Gear Main Ramp |
| 87 | |
| 88 | Drive Gear Manual Fold Ring Ramp |
| 89 | |
| 90 | Drive Disc (become part of base) |
| 94 | Clutching Face |
| 95 | Clutch Ramp |
| 100 | Main Ramp Ring |
| 101 | Main Ramp Ring Spring |
| 102 | Main Ramp Ring Push Face |
| 103 | Main Ramp Recesses |
| 105 | Main Ramp Ring Minor Spring |
| 105 | Main Ramp Ring Sensor Component |
| 106 | Main Ramp Ring Ramp |
| 107 | Steep Clutch Ramp |
| 108 | Knee |
| 109 | Shallow Clutch Ramp |
| 110 | Electric Stall Ring |
| 111 | Electric Stall Ring Spring |
| 114 | Electric Stall Ring Ramp |
| 115 | Electric Stall Ring Stop |
| 116 | Sensor on Stall Ring |
| 120 | Manual Fold Ring |

| Legend: | |
|---|---|
| No. | Description |
| 122 | Manual Fold Ring Pushing Face |
| 123 | Manual Fold Ring Ramp |
| 125 | Manual Fold Ring Actuator |
| 126 | Manual Fold Ring Sensor Component |
| 130 | Manual Fold Spring |
| 220 | Secondary Ramp Ring |
| 222 | Secondary Ramp Ring Reation Face |
| 224 | Secondary Ramp Ring Helper Ramp |
| 229 | Spline Key |

The invention claimed is:

1. An external rear view mirror assembly comprising:
a mounting bracket mountable to a vehicle, the mounting bracket having a mirror base with detent features disposed on a detent circle on the mirror base;
a mirror head frame rotatably mounted to the mirror base for rotation about a mirror head axis, the mirror head frame having detent features to match the detent features of the mirror base, the detent features of the mirror base and the mirror head frame forming a detent system, the detent system having at least a drive position,
wherein the mirror head frame is shaped to provide an aperture to receive either of:
a manual fold insert;
or a power fold mechanism having a clutch mechanism,
the aperture at least partially inboard in a radial direction with respect to the detent features on the mirror head frame whereby at least the clutch mechanism of the power fold mechanism is accommodated to operate on a smaller radius than that of the detent features;
a primary spring acting between the mirror head frame and the mirror base in a direction parallel to the mirror head axis, the primary spring for holding the detent engaged in the detent position(s); and
a power fold mechanism operably interposed between the mirror base and the mirror head frame, the power fold mechanism having a drive train, the drive train including a motor mounted to the power fold housing and a drive gear operatively connected to the motor, the drive gear having a plurality of circumferentially spaced apart axially extending protrusions; and
a clutch mechanism, the clutch mechanism comprising a pair of opposed clutching faces connecting the drive train to the mirror base when the drive train is driving, the clutch mechanism including a main ramp ring interposed between the drive gear and the mirror base, the main ramp ring having a plurality of ramped recesses for receiving respective said protrusions such that relative rotation between the drive gear and the main ramp ring results in their relative axial displacement, the main ramp ring operatively connected to the mirror base, the clutch having an engaged position where the main ramp ring is rotationally fixed with respect to the mirror base and a disengaged position in which the main ramp ring is rotatable with respect to the mirror base; and
a manual fold torque transmission member the manual fold torque transmission member having an engaged position in which it engages the main ramp ring such that the main ramp ring rotates with the housing and having a disengaged position in which the main ramp ring is not constrained to rotate with the housing, whereby during manual folding of the mirror head from the drive position forces are not transmitted from the mirror head frame to the drive gear.

2. An assembly as claimed in claim 1 wherein the manual fold torque transmission member comprises a manual fold ring splined to the power fold housing to allow relative axial movement but not relative rotational movement with respect to the housing.

3. An assembly as claimed in claim 2 wherein the manual fold ring is movable from its engaged position to its disengaged position by the drive gear.

4. As assembly as claimed in claim 1 including a drive disc interposed between the mirror base and the main ramp ring, the drive disc having a clutching face that engages an opposed clutching face on the main ramp ring to provide the clutch.

5. An external rear view mirror assembly comprising:
a mounting bracket mountable to a vehicle, the mounting bracket having a mirror base with detent features disposed on a detent circle on the mirror base;
a mirror head frame rotatably mounted to the mirror base for rotation about a mirror head axis, the mirror head frame having detent features to match the detent features of the mirror base, the detent features of the mirror base and the mirror head frame forming a detent system, the detent system having at least a drive position,
wherein the mirror head frame is shaped to provide an aperture to receive either of:
a manual fold insert;
or a power fold mechanism having a clutch mechanism,
the aperture at least partially inboard in a radial direction with respect to the detent features on the mirror head frame whereby at least the clutch mechanism of the power fold mechanism is accommodated to operate on a smaller radius than that of the detent features;
a primary spring acting between the mirror head frame and the mirror base in a direction parallel to the mirror head axis, the primary spring for holding the detent engaged in the detent position(s); and
a power fold mechanism operably interposed between the mirror base and the mirror head frame, the power fold mechanism having a drive train, and a clutch mechanism, the clutch mechanism comprising a pair of opposed clutching faces connecting the drive train to the mirror base when the drive train is driving, the clutch mechanism arranged and constructed such that forces are not transmitted from the mirror head frame to the drive train during manual folding of the mirror head when the drive train is not driving, the power fold mechanism including a power fold housing installable into the mirror head frame for rotation therewith, a drive train including a motor mounted to the power fold housing and a drive gear operatively connected to the motor, the drive gear having a plurality of circumferentially spaced apart axially extending protrusions;
the clutch mechanism including a main ramp ring interposed between the drive gear and the base, the main ramp ring having a plurality of ramped recesses for receiving respective said protrusions such that relative rotation between the drive gear and the ramp ring results in their relative axial displacement, the main ramp ring operatively connected to the mirror base, the clutch having an engaged position where the main ramp ring is rotationally fixed with respect to the mirror base and a disengaged position in which the main ramp ring is rotatable with respect to the mirror base; and
an electric stall system having a stall position in which the system stalls the drive gear such that the drive gear cannot rotate with respect to the power fold housing, and having a non-stall position in which the system does not restrict rotation of the drive gear with respect to the housing.

6. An assembly as claimed in claim 5 wherein the electric stall system comprises an electric stall ring, the electric stall ring splined to the power fold housing to allow relative axial movement but not relative rotational movement with respect to the power fold housing,
whereby a stall torque is generated once the stall position is reached and wherein the stall torque does not transfer to the clutch.

7. An assembly as claimed in claim 6 wherein the electric stall ring and the drive gear are mutually shaped and positioned to provide a stall position in which relative rotation between the electric stall ring and the drive gear is blocked in at least one direction.

8. An assembly as claimed in claim 5 wherein the electric stall system comprises a sensor system, the sensor system detecting at least one relative rotational position between the housing and the drive gear,
wherein the sensor system stalls the drive gear by cutting power to the motor.

* * * * *